United States Patent
Fielding

(10) Patent No.: US 10,825,207 B2
(45) Date of Patent: Nov. 3, 2020

(54) GRAPHICS TEXTURE MAPPING

(71) Applicant: Arm Limited, Cambridge (GB)

(72) Inventor: Edvard Fielding, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/220,463

(22) Filed: Dec. 14, 2018

(65) Prior Publication Data

US 2020/0193650 A1    Jun. 18, 2020

(51) Int. Cl.
*G06T 11/00* (2006.01)
*G06T 11/40* (2006.01)

(52) U.S. Cl.
CPC ............ *G06T 11/001* (2013.01); *G06T 11/40* (2013.01); *G06T 2210/52* (2013.01)

(58) Field of Classification Search
CPC .... G06T 11/001; G06T 11/40; G06T 2210/52
See application file for complete search history.

(56) References Cited

U.S. PATENT DOCUMENTS

| | | | |
|---|---|---|---|
| 2004/0066385 A1* | 4/2004 | Kilgard | G06T 15/04 345/506 |
| 2014/0152684 A1* | 6/2014 | Nystad | G06T 15/04 345/582 |
| 2017/0024847 A1* | 1/2017 | Engh-Halstvedt | G06T 1/20 |
| 2017/0032489 A1* | 2/2017 | Nystad | G06T 1/20 |

\* cited by examiner

*Primary Examiner* — Sing-Wai Wu
(74) *Attorney, Agent, or Firm* — Vierra Magen Marcus LLP

(57) ABSTRACT

A fragment shader program to be executed by a fragment shader of a graphics processor can include a graphics texturing instruction that when executed by the fragment shader will cause the fragment shader to send a request to the texture mapper to perform a graphics texture mapping operation in which the texture mapper will perform plural lookups from the same texture in parallel. In response to the request from the fragment shader, the texture mapper of the graphics processor performs plural lookups from the same texture in parallel, and generates a texture mapping operation result using the results of the plural lookups from the same texture for returning to the fragment shader.

21 Claims, 6 Drawing Sheets

GRAPHICS TEXTURE MAPPING

BACKGROUND

The technology described herein relates to a method of and an apparatus for performing texture mapping in graphics processing systems.

It is common in graphics processing systems to generate colours for sampling positions in a render output (e.g. image to be displayed) by applying so-called textures or texture data to the surfaces to be drawn. Such textures are typically applied by storing an array of texture elements or "texels", each representing given texture data (such as colour, luminance and/or light/shadow, etc. values), and then mapping the texels onto the corresponding elements, such as (and, indeed, typically) a set of sampling positions, for the render output in question (e.g. image to be displayed).

Thus a graphics texture will typically be configured as an array of data elements (texture elements (texels)), each having a corresponding set of texture data stored for it. The texture data for a given position within the texture is then determined by sampling the texture at that position (e.g. using a bilinear interpolation process).

FIG. 1 shows an exemplary graphics processor (graphics processing unit (GPU)) 100 that can perform texture mapping.

As shown in FIG. 1, the GPU 100 comprises data processing circuitry that implements a graphics processing pipeline. The pipeline includes, inter alia, a rasterizer 102 and a renderer in the form of a programmable (fragment) shader core 104. The pipeline uses a buffer 106 (e.g. in external memory 108) for storing an output array (e.g. frame or image to be displayed).

The GPU 100 further comprises a texture mapper 110, and the memory 108 will also store, inter alia, graphics textures to be used by the GPU 100 when performing texture mapping operations.

In this system, the rasterizer 102 will rasterize input primitives into individual graphics fragments for processing. To do this, the rasterizer 102 rasterizes the primitives to sampling positions representing the render output, and generates graphics fragments representing appropriate sampling positions for rendering the primitives. Each fragment may represent a single sampling position or a set of plural sampling positions. The fragments generated by the rasterizer 102 are then sent onwards to the fragment shader (renderer) 104 for shading.

The fragment shader 104 executes shader programs for the fragments issued by the rasterizer 102 in order to render (shade) the fragments. The fragments are processed using execution threads in the shader core, with the threads executing the shader program(s) that are to be used to process the fragments. A thread is executed for each sampling position that is to be shaded.

A shader program may include texturing instructions for texture mapping operations that are required to be executed by the texture mapper 110.

When a texturing instruction is encountered by the fragment shader 104, a texturing instruction is sent from the fragment shader 104 to the texture mapper 110, requesting the texture mapper 110 to perform a texture mapping operation.

When instructed by the fragment shader 104 to perform a texture mapping operation, the texture mapper 110 will perform a texture "lookup", to generate and return an, e.g. RGB, colour, value sampled from the texture, to the fragment shader 104, e.g. for use when shading the fragment and sampling position(s) in question.

To perform the texture "lookup", the texture mapper will fetch or generate a set of texels (texture data elements) (their values) for the texture (such as a set of four texels for a bilinear filtering operation). The texture mapper 110 will then perform a texture filtering operation (such as a bilinear filtering) operation) using the texels to generate the (sampled) texture value that is returned to the fragment shader 104.

The "shaded" fragment sampling positions from the fragment shader 104 are then stored as part of the output render target in the buffer 106, e.g. in the memory 108, e.g. for subsequent post-processing or display.

The Applicants believe that there is scope for improvements to the performance of texture mapping in graphics processing systems.

BRIEF DESCRIPTION OF THE DRAWINGS

Embodiments of the technology described herein will now be described by way of example only and with reference to the accompanying drawings, in which.

Like numerals are used for like features in the drawings where appropriate.

DETAILED DESCRIPTION

Figure 1:
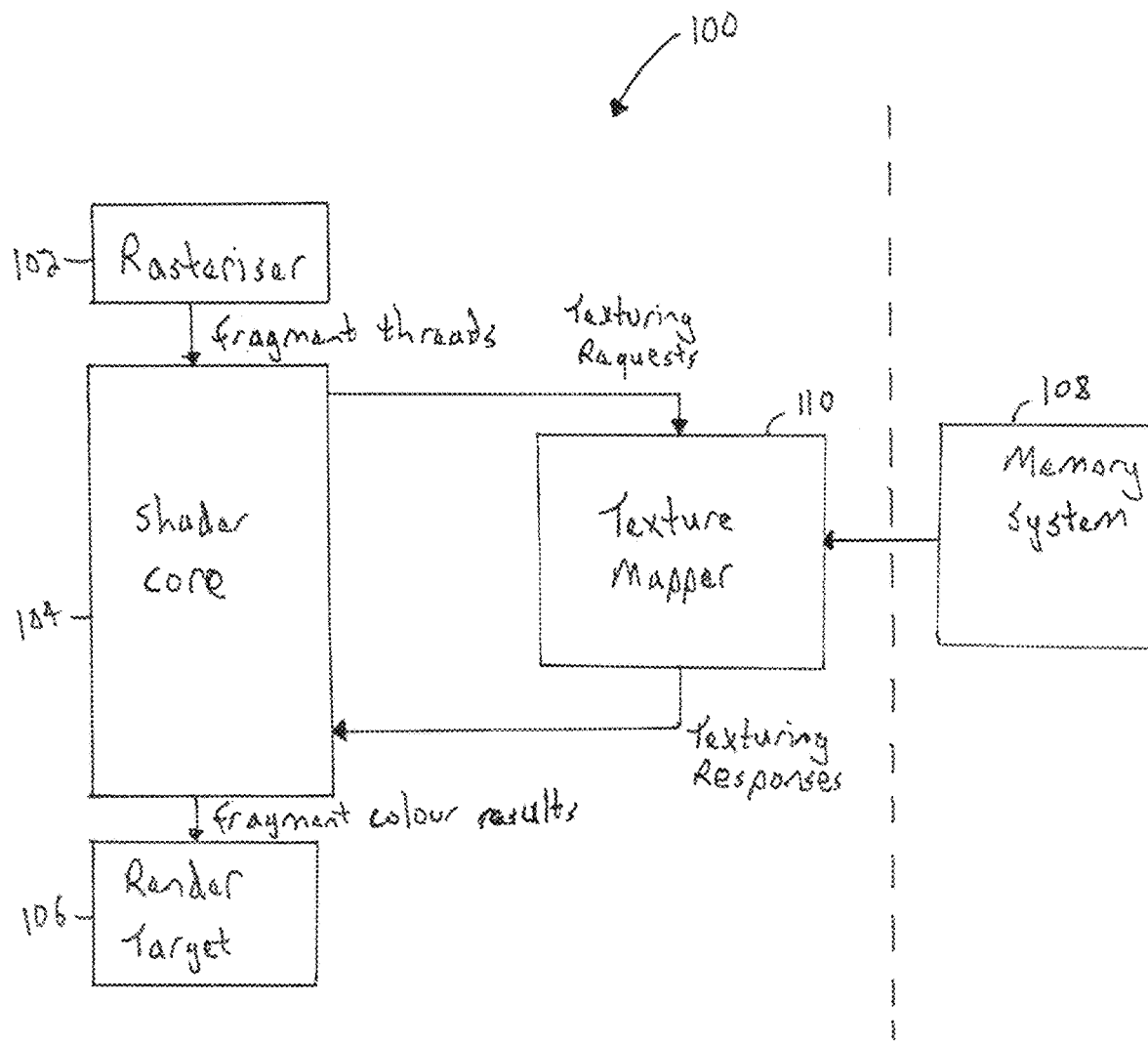
FIG. 1 shows schematically a graphics processor that includes a texture mapper.

A first embodiment of the technology described herein comprises a method of operating a graphics processor, the graphics processor comprising:

a programmable fragment shader operable to execute graphics fragment shading programs to perform fragment shading operations; and a texture mapper operable to perform graphics texture mapping operations in response to requests for graphics texture mapping operations from the fragment shader;

wherein:

the fragment shader processes graphics fragments by executing fragment shader programs using execution threads for sampling positions of a render output being generated by the graphics processor; and the fragment shader is operable to, when it encounters a graphics texturing instruction in a fragment shader program that it is executing for a thread:

request the texture mapper to perform a graphics texture mapping operation for the thread that is executing the graphics texturing instruction in the fragment shader program; and the texture mapper is operable to, in response to a request from the fragment shader to perform a graphics texture mapping operation for an execution thread that is executing a graphics texturing instruction in a shader program:

perform the graphics texture mapping operation for the execution thread;

the method comprising:

including in a fragment shader program to be executed by the fragment shader of the graphics processor when generating a render output, a graphics texturing instruction that when executed by the fragment shader will cause the fragment shader to send a request to the texture mapper to perform a graphics texture mapping operation in which the texture mapper will perform plural lookups from the same texture in parallel; and the fragment shader, when it executes the instruction for a thread, sending a request to the texture mapper to perform a graphics texture mapping operation in which the texture mapper will perform plural lookups from the same texture in parallel; and the texture mapper, in response to the request from the fragment shader, performing a graphics texture mapping operation, including:

performing plural lookups from the same texture in parallel;

generating a texture mapping operation result using the results of the plural lookups from the same texture; and returning the generated texture mapping operation result to the fragment shader.

A second embodiment of the technology described herein comprises a graphics processing system, the graphics processing system comprising:

a graphics processor comprising:

a programmable fragment shader operable to execute graphics fragment shading programs to perform fragment shading operations; and a texture mapper operable to perform graphics texture mapping operations in response to requests for graphics texture mapping operations from the fragment shader;

wherein:

the fragment shader processes graphics fragments by executing fragment shader programs using execution threads for sampling positions of a render output being generated by the graphics processor; and the fragment shader is operable to, when it encounters a graphics texturing instruction in a fragment shader program that it is executing for a thread:

request the texture mapper to perform a graphics texture mapping operation for the thread that is executing the graphics texturing instruction in the fragment shader program; and the texture mapper is operable to, in response to a request from the fragment shader to perform a graphics texture mapping operation for an execution thread that is executing a graphics texturing instruction in a shader program:

perform the graphics texture mapping operation for the execution thread;

wherein:

the graphics processing system further comprises processing circuitry operable to:

include in a fragment shader program to be executed by the fragment shader of the graphics processor when generating a render output, a graphics texturing instruction that when executed by the fragment shader will cause the fragment shader to send a request to the texture mapper to perform a graphics texture mapping operation in which the texture mapper will perform plural lookups from the same texture in parallel;

and the fragment shader is configured to, when it executes the instruction for a thread:

send a request to the texture mapper to perform a graphics texture mapping operation in which the texture mapper will perform plural lookups from the same texture in parallel; and the texture mapper is configured to, in response to the request from the fragment shader:

perform a graphics texture mapping operation including:

performing plural lookups from the same texture in parallel;

generating a texture mapping operation result using the results of the plural lookups from the same texture; and returning the generated texture mapping operation result to the fragment shader.

A third embodiment of the technology described herein comprises a graphics processor comprising:

a programmable fragment shader operable to execute graphics fragment shading programs to perform fragment shading operations; and a texture mapper operable to perform graphics texture mapping operations in response to requests for graphics texture mapping operations from the fragment shader;

wherein:

the fragment shader processes graphics fragments by executing fragment shader programs using execution threads for sampling positions of a render output being generated by the graphics processor; and the fragment shader is operable to, when it encounters a graphics texturing instruction in a fragment shader program that it is executing for a thread:

request the texture mapper to perform a graphics texture mapping operation for the thread that is executing the graphics texturing instruction in the fragment shader program; and the texture mapper is operable to, in response to a request from the fragment shader to perform a graphics texture mapping operation for an execution thread that is executing a graphics texturing instruction in a shader program:

perform the graphics texture mapping operation for the execution thread;

wherein:

the fragment shader is configured to, in response to executing a graphics texturing instruction included in a fragment shader program being executed by the fragment shader that when executed by the fragment shader will cause the fragment shader to send a request to the texture mapper to perform a graphics texture mapping operation in which the texture mapper will perform plural lookups from the same texture in parallel:

send a request to the texture mapper to perform a graphics texture mapping operation in which the texture mapper will perform plural lookups from the same texture in parallel; and the texture mapper is configured to, in response to the request from the fragment shader:

perform a graphics texture mapping operation including:

performing plural lookups from the same texture in parallel;

generating a texture mapping operation result using the results of the plural lookups from the same texture; and returning the generated texture mapping operation result to the fragment shader.

The technology described herein relates to texture mapping in graphics processing. In the technology described herein, when a fragment shader of a graphics processor encounters texturing instructions to be processed, it requests the appropriate texture mapping operations from an associated texture mapper of the graphics processor.

In the technology described herein, a fragment shader program can include a texturing instruction to cause the texture mapper to perform a graphics texture mapping operation in which the texture mapper will perform plural (e.g., and as will be discussed further below, in an embodiment, two or four) lookups from the same texture in parallel. As will be discussed further below, this can then be used to increase the throughput of the texture mapper and texture mapping operation when performing texture mapping operations, such as, for example, to trigger the texture mapper to perform two bilinear texture lookups in parallel.

In the technology described herein, a particular, in an embodiment selected, in an embodiment predefined, form of graphics texturing instruction is included in a shader program to be executed by the fragment shader, and is recognised by the fragment shader as a texturing instruction that requires a texture mapping operation in the manner of the technology described herein, with the fragment shader then operating to send appropriate request(s) (instruction(s)) to the texture mapper to perform the texture mapping operation (and return the result of the texture mapping operation to the fragment shader for further processing and/or other use).

The fragment shader program texturing instruction that is used to trigger the texture mapping operation in the manner of the technology described herein can take any suitable and desired form. It should at least be, and is in an embodiment, identifiable as indicating that a texture mapping operation in the manner of the technology described herein is required (and distinguishable from texturing instructions that require (and request) other forms of texture mapping operation).

The graphics texturing instruction of the technology described herein (that is included in the fragment shader program) should, and in an embodiment does, at least indicate the texture that the plural lookups are to be taken from. This information may be provided, for example, and in an embodiment, in the form of a "texture descriptor", that may, e.g., indicate a "surface descriptor" for the texture mapping operation that indicates and/or describes the texture that the texture "lookups" are to be performed in. For example, the instruction may include an index or pointer to the texture or texture descriptor in question.

In the technology described herein, the texture mapper is instructed to and operates to perform plural lookups from the same, single texture in parallel. Thus the texturing instruction will indicate one and only one (a single) texture to lookup from for the texture mapping operation in question. Where textures are stored in the form of mipmaps, each lookup is in an embodiment from a single mipmap level only. In an embodiment, all of the plural lookups are each from the same, single mipmap level.

In an embodiment the number of lookups the texture mapper will perform in parallel for the texturing operation is based on, and determined based on, the dimensionality of the texture (e.g. if it is a 2D or 1D texture), and, in an embodiment, on the dimensionality of the texture coordinate that the instruction indicates (as discussed below).

In an embodiment, the texturing instruction and operation in the manner of the technology described herein can be used to cause the texture mapper to perform two lookups in parallel from a two-dimensional (2D) texture or four lookups in parallel from a one-dimensional (1D) texture. Thus in an embodiment, that texture mapper is caused to perform two lookups from the same (2D) texture in parallel, and in another embodiment the texture mapper is caused to perform four lookups from the same (1D) texture in parallel.

The graphics texturing instruction of the technology described herein in an embodiment (also) indicates the (sampling) positions with the texture at which the texture lookups should be made (in respect of which the texture lookups should be performed).

In an embodiment, the texturing instruction indicates a single, in an embodiment multidimensional (multicomponent), coordinate from which (the coordinates of) the (sampling) positions that the plural lookups from the texture should be made at can be (and are to be) derived (with the texture mapper in an embodiment then deriving the (sampling) positions at which to perform the lookups from that single coordinate).

In an embodiment the instruction uses (includes) a (single) four-dimensional (4D) coordinate (i.e. a four component coordinate), that is then used by the texture mapper to determine the (coordinates of) the sampling positions at which each of the plural lookups from the texture should be performed.

In an embodiment, the 4D texture coordinate is either used to derive two 2D sampling positions (two, 2D coordinates) at which to perform (two) lookups from the same 2D texture in parallel, or to derive four 1D sampling positions (four, 1D coordinates) at which to perform four lookups from the same 1D texture in parallel. In the former case, each respective pair of components of the 4D coordinate is in an embodiment used as a respective 2D coordinate to sample at in the 2D texture. In the latter case, each individual component in the 4D coordinate is in an embodiment used as a separate 1D coordinate at which to sample at in the 1D texture.

The graphics texturing instruction that is included in the fragment shader program to trigger the operation in the manner of the technology described herein in an embodiment (also) indicates the particular texture mapping operation that is to be performed using the results of the plural texture lookups (i.e. how the texture mapper is to generate its texture mapping operation result using the results of the plural lookups from the same texture). In an embodiment, the instruction can indicate that one of a set of plural particular, in an embodiment selected, in an embodiment predefined, texture mapping operations is to be performed.

In one embodiment, the graphics texturing instruction indicates both a texture filtering operation mode to be used and a reduction operation (mode) to use (this will be discussed in more detail below).

Thus, in an embodiment, the graphics texturing instruction of the technology described herein has as a (variable) input parameter a, in an embodiment four-dimensional, texture coordinate (per thread) (which is in an embodiment the only variable input parameter per thread), together with one or more "constant" input (control) parameters that are shared between all threads executing the shader program in question, which set of constant input parameters in an embodiment includes one or more, and in an embodiment all of: a texture to sample from, a filtering mode to use, a "reduction" mode to use, and the dimensionality of the texture (e.g. 1D or 2D). The set of "constant" input parameters may additionally include optional "constant" parameters, such as texel offsets, texture array index, mipmap explicit level of detail selection or level of detail bias, linear interpolation parameter, etc., if desired.

The texture mapping operations that can be indicated and performed by the graphics texturing instruction in the manner of the technology described herein can be any suitable and desired texture mapping operations that can be performed using the results of plural texture lookups from the same texture.

In an embodiment, the texture mapping operations that can be performed (and indicated to be performed) using the instructions in the manner of the technology described herein are configured and operable to return to the fragment shader (from the texture mapper) less data than the amount of data that would be generated by the plural lookups from the texture if those lookups were processed to generate a lookup "result" in the "normal" manner. Thus, the texture mapping operations that can be and are performed using the plural lookups from the same texture are in an embodiment so as to reduce the amount of data generated by the plural lookups to a reduced amount of data for returning to the fragment shader for further use (i.e. the generating the texture mapping operation result using the results of the plural lookups from the same texture is in an embodiment so as to reduce the amount of data generated by the plural lookups to a reduced amount of data for returning to the fragment shader for further use).

In an embodiment, all the different graphics texture mapping operations that the texturing instruction can cause the texture mapper to perform using the data from the plural lookups from the same texture are configured to each (and always) generate the same, particular, in an embodiment selected, in an embodiment predetermined, size of data value for returning to the fragment shader (i.e. the texture mapping operation result that is generated using the results of the plural lookups from the same texture is always the same (fixed) size). In an embodiment the texture mapping operation generates and returns a (single) multicomponent data value.

In an embodiment, each texturing instruction (request) in the manner of the technology described herein uses, as discussed above, a (single) multicomponent (texture) coordinate as an input variable to determine the positions (coordinates) at which the texture lookups should be performed, and returns a multicomponent output value having the same number of components as the input variable to the fragment shader as the result of the texture mapping operation.

Thus, in an embodiment, each texturing instruction (request) in the manner of the technology described herein uses, as discussed above, a (single) four component texture coordinate as an input variable to determine the positions (coordinates) at which the texture lookups should be performed, and returns a four component output value to the fragment shader as the result of the texturing operation.

Thus, in an embodiment, the (selectable) graphics texture mapping operations are each operable (configured) to generate a result that comprises four data values (a four component vector) using the results of the plural lookups from the same texture for returning to the fragment shader.

Thus, for example, where two lookups from the same 2D texture are performed in parallel (which would in normal operation each return two, e.g. four component, values from the texture), the texturing operation that is performed using those two, e.g. four component, values is in an embodiment operable to reduce those two, e.g. four component, values to a single, e.g. four component, value for returning to the fragment shader.

Correspondingly, when performing four texture lookups from the same 1D texture in parallel (which would thereby provide four, e.g. four component, data values in normal operation), the texture mapping operation that is performed using those four, e.g. four component, data values is in an embodiment so as to reduce those four, e.g. four component, data values to a single, e.g. four component, data value for returning to the fragment shader.

The texture mapping operations that the texture mapper can perform (and can be instructed to perform) when using texturing instructions in the manner of the technology described herein can comprise any suitable and desired form of texture mapping operations (e.g., and in an embodiment, that will be operable to return the desired size of result (number of output data values (components)) from the results of the plural lookups from the texture.

In an embodiment, a texture mapping operation that can be performed using the results of the plural lookups comprises performing a mathematical operation using the results of the texture lookups (and thus, generating a texture mapping operation result using the results of the plural lookups from the same texture comprises performing a mathematical operation using the results of the plural lookups from the same texture).

In this case, the texture mapping operation can in an embodiment be selected from a set of one or more of, and in an embodiment all of, the following operations: returning the sum of the texture lookup results (i.e. adding the result of one texture lookup to the result of the other texture lookup(s)); returning the difference between the texture lookups results (i.e. subtracting the result of one texture lookup from the result of the other texture lookup); returning the minimum of the texture lookups; and returning the maximum of the texture lookups.

In the case where a mathematical operation is being performed, then that is in an embodiment performed in respect of each texture lookup result component (channel) separately. Thus for an addition or subtraction operation, the first component of one texture lookup will be added to or subtracted from the first component of the other texture lookup to give a result "first" component value, the second component of one texture lookup will be added to or subtracted from the second component of another texture lookup to give a resultant "second" component value, and so on (such that, in the case of performing two texture lookups from a 2D texture, the returned result would be the component-wise sum or difference of those texture lookups).

Thus, in the case of performing two lookups in parallel from a 2D texture, for example, the graphics texturing operation can in an embodiment return the sum of the two lookups (add the two lookups together), or return the difference between the two lookups (subtract one lookup from the other), or return the minimum of the two lookups, or return the maximum of the two lookups.

In an embodiment, a texture mapping operation that can be performed using the results of the plural lookups also or instead (and in an embodiment also) comprises packing selected data values (components) from the plural texture lookups together to provide the result of the texture mapping operation (and thus, generating a texture mapping operation result using the results of the plural lookups from the same texture, comprises packing selected data values (components) from the results of the plural lookups from the same texture together to generate (provide) the result that is returned to the fragment shader). This form of texture mapping operation will accordingly return the data values from selected (and only selected) positions (components) in the texture lookup results.

In these arrangements, the operation could return the data values from the same, selected position or positions (component or components) in each of the texture lookups. This could comprise, for example, returning the first or last component of each looked-up data value (e.g. in the case of performing four lookups into a 1D texture), and/or returning the same pair (e.g. the top pair or the bottom pair) of each looked-up data value in the case of performing two lookups from a 2D texture.

Alternatively, the operation could be so as to return the data values from a different selected position or selected positions in each texture lookup result.

For example, and in an embodiment, the data values from sequential positions from each lookup that was performed in parallel could be returned as the texture mapping operation result. For example, in the case of performing four lookups from a 1D texture in parallel, the texturing operation could comprise returning the first component of the first lookup, the second component of the second lookup, the third component of the third lookup, and the fourth component of the fourth lookup (or any variation of this). Correspondingly, for two lookups from a 2D texture, the texturing operation could comprise returning the first two components from the first lookup and the latter two components from the second lookup (or vice-versa).

In an embodiment, a graphics texturing instruction can indicate that one of a set of some or all of the above texture mapping operations is to be performed using the results of the texture lookups.

In an embodiment, there is a different set (pool) of operations that can be selected from depending upon how many lookups are being performed, and/or the nature of the texture that the lookups are being performed in. For example, a different set of possible operations may be provided and selectable from for 2D textures, as compared to 1D textures. For example, in an embodiment, in the case of 2D textures, any of the above mathematical or "packing" operations can be used and selected from. In the case of 1D textures, in an embodiment any of the above "packing" operations can be used and selected from. Other arrangements would, of course, be possible.

When the fragment shader encounters a texturing instruction of the form of the technology described herein in a shader program that it is executing for a thread, the fragment shader sends an appropriate request to the texture mapper to perform the required graphics texture mapping operation, in response to which request the texture mapper will perform the required texture mapping operation.

The texture mapping operation request sent to the texture mapper in an embodiment indicates similar information to the texturing instruction, such as, and in an embodiment, the texture mapping operation to be performed, the texture to be used for the texture mapping operation (e.g. where the texture (data) for the texture mapping operation is stored), and any other necessary input parameters (texture mapping operation settings (control data)), e.g. that define (aspects of) the texture mapping operation to be performed.

This information is in an embodiment conveyed using one or more descriptors, that may, e.g., be contained in the request(s) itself and/or may be stored (e.g. in memory) (with the request, e.g., including an index or pointer to the descriptor(s)). The storage (e.g. memory) used to store the one of more descriptors may be the same memory or may be a different memory to that which stores the textures. The texture mapper may be operable to fetch, and may fetch, the descriptors and/or input parameters required to perform a texture mapping operation, e.g. from memory, in response to a request to perform a texture mapping operation.

The descriptors may take any desired and suitable form. For example, a descriptor may comprise a "texture descriptor", that may indicate one or more "surface descriptors" for the texture mapping operation. A surface descriptor may indicate and/or describe an array of texture data values or surface (a texture(s)) with which the texture mapping operation should be performed. The descriptors may further comprise a sampler descriptor. The sampler descriptor may indicate a filtering method (e.g. bilinear, trilinear, etc.) and/or other parameters (settings) to be used for the texture mapping operation.

In an embodiment, the texturing instruction executed by the fragment shader causes one texturing request to be sent to the texture mapper. The fragment shader in an embodiment transfers at least the "constant" input (control) parameters in the instruction in the request to the texture mapper unchanged from the instruction (uninterpreted by the fragment shader), i.e. such that the bits in the instruction are just passed forward by the fragment shader to the texturing request. In the case where the instruction in the fragment shader program indicates in which register(s) the input texture coordinate values are stored, the fragment shader in an embodiment reads the coordinates from the registers and appends the read coordinates to the texturing request that is sent to the texture mapper.

In an embodiment, the texture mapper correspondingly includes data processing circuitry (circuit) operable to receive a texture mapping operation request, and to, in response to receiving the texture mapping operation request, control the texture mapper to fetch or generate texels (texture data values) with which the texture mapping operation is to be performed, and to cause the texture mapper to perform the texture mapping operation using the fetched or generated texels (set of texture data values).

In response to the request for the texture mapping operation from the fragment shader, the texture mapper will perform the requested graphics texture mapping operation, including performing the plural lookups into the same texture in parallel, and generating a texture mapping operation result for returning to the fragment shader using the results of the plural lookups.

Each lookup into the texture can be performed in any suitable and desired manner, e.g. in accordance with the normal operation of the texture mapper when performing a lookup into a texture (except that plural lookups into the same texture will be performed in parallel (simultaneously) (i.e. such that the corresponding operations for each lookup of the plural lookups will be performed at the same time (in the same (clock) cycle).

In the case where the texture is stored as an array of data values, e.g., and in an embodiment, in memory, a (and each) lookup should, and does in an embodiment, fetch a set of one or more (and in an embodiment plural) texels (texture data elements (values)) from the texture that the lookups are being performed in. For example, and in an embodiment, when performing two lookups in parallel into a 2D texture, each lookup will fetch four texels. Correspondingly, when performing lookups into a 1D texture, each lookup will fetch two texel values (and so four lookups into a 1D texture will fetch four pairs of texel values, one pair for each lookup). Thus, the results of the plural lookups into the same texture will comprise (at least) a set of one or more (and in an embodiment plural) texels (texture data element values) for each lookup.

It is also envisaged that the technology described herein can be used in the case of "procedurally generated" textures (i.e. where texel values are procedurally generated in use, rather than being fetched from storage (e.g. memory) where they are stored). In this case, a (and each) lookup would procedurally generate a set of one or more (and in an embodiment plural) texels (texture data elements (values)). For example and in an embodiment, when performing two lookups in parallel into a 2D "procedural" texture, each lookup will procedurally generate four texels, and when performing four lookups into a 1D procedural texture, each lookup will procedurally generate two texel values. Thus, the results of the plural lookups into the same texture will again comprise (at least) a set of one or more (and in an embodiment plural) texels (texture data element values) for each lookup.

The texture mapper can use the results of the lookups to generate the texture mapping operation result that is returned to the fragment shader in any suitable and desired manner. As discussed above, this should be, and is in an embodiment, in accordance with an indicated texture mapping operation that is to be performed.

In one embodiment, the texture mapper processes the texels fetched (or generated) for each texture lookup separately, to thereby generate for each lookup a respective "intermediate" result, before then performing an appropriate operation to combine (reduce) those lookup "intermediate results" to provide the texture mapping operation result that is returned to the fragment shader.

In this case, the lookups into the texture would each fetch (or generate) the required texels, and the texture mapper would then perform a, in an embodiment filtering, operation using those texels, before the results of those operations (the results of filtering the texels) are then used to generate the required texture mapping operation result that is returned to the fragment shader.

For example, in the case of performing two lookups into a 2D texture, the texture mapper would fetch (or generate) four texels for each lookup, perform a bilinear filtering operation to produce two bilinearly filtered results, one from each respective set of four texels, and then perform an appropriate operation using the two bilinearly sampled results (e.g. to determine their maximum or minimum, etc.) to provide the texture mapping operation result that is returned to the fragment shader.

Correspondingly, in the case of four lookups into a 1D texture, each lookup would fetch (or generate) two texel values, and the texture mapper could then perform a linear filtering operation using a (and for each) pair of texels to provide a 1D filtered result, with the four 1D filtered results then being processed appropriately to provide the overall texture mapping operation result that is returned to the fragment shader.

In these cases therefore, the overall texture mapping operation would effectively comprise three stages, first fetching (or generating) the texels (their values) for each lookup, then performing an initial (e.g. bilinear or linear) filtering operation using those texels to provide sampled texture values per lookup (one for each lookup), and then further processing those sampled texture values to provide the texture mapping operation result that is returned to the fragment shader. In this case, the texture mapping operation after the texels (their values) have been fetched (or generated) may require two processing cycles, for example, one to perform the initial filtering (combining) of the texels per lookup, and the next to then "combine" the per-lookup values appropriately.

Thus, in one embodiment, for each texture lookup a single (filtered) texture lookup value is first generated, with the texture "lookup" values from the plural lookups then being subjected to a further "reduction" operation to thereby generate the texture mapping operation result that is returned to the fragment shader.

Where an initial filtering operation using the fetched (or generated) texels is to be performed, then the texture mapper can perform that operation in any suitable and desired manner, for example, and in an embodiment, in accordance with the way that the texture mapper would normally perform such filtering operations.

In an embodiment, the texture mapper is also or instead (and in an embodiment also) configured and operable to process the fetched (or generated) texels (their values) for the texture lookups directly to provide the output texture mapping operation result that is returned to the fragment shader.

In this case, there would be no "intermediate" operation of, e.g. filtering, the texels to provide an "intermediate" result that is then processed further, but rather the texture mapper would take the texel values and process them directly to provide the texture mapping operation result that is returned to the fragment shader. In this case therefore, the texture lookups will fetch (or generate) the texels (texel values), with the texture mapper then using the texels directly to generate the texture mapping operation result that is returned to the fragment shader.

For example, in the case of performing two lookups into a 2D texture, the texture mapper will take the eight texels (the two sets of four texels) returned by the texture lookup and process those values directly to provide the texture mapping operation result that is returned to the fragment shader. Correspondingly, in the case of four lookups into a 1D texture, the texture mapper would process the four pairs of texels (one for each lookup into the 1D texture) directly to provide the texture mapping operation result that is returned to the fragment shader.

In this case therefore, the overall texture mapping operation would effectively comprise two stages, first fetching (or generating) the texels (their values) for each lookup, and then processing those texel values to provide the texture mapping operation result that is returned to the fragment shader. In this case, the texture mapping operation (after the texels have been fetched (or generated)) may be performed in only a single processing cycle (that processes all the fetched (or generated) texel values to provide the texture mapping operation result that is returned to the fragment shader).

In an embodiment, the texture mapper is able to both process the results of the lookups to generate the texture mapping operation result that is returned to the fragment shader using the texels fetched (or generated) by the lookups directly, and by performing an intermediate processing of the texels for each lookup, before then combining the intermediate results for each lookup to provide the texture mapping operation result that is returned to the fragment shader. This may, and in an embodiment does, depend upon what the overall required texture mapping operation is, and whether the texture mapper can perform that operation in a single step using the texels directly or not.

For example, where the texture mapper is able to perform two bilinear filtering operations in parallel (using two sets of four input texels), then that functionality could be used, for example, to perform an addition or subtraction operation in the manner of the technology described herein (as discussed above) using the texel values directly.

On the other hand, where the results of the texture lookups are to be "packed" to provide the texture mapping operation result that is returned to the fragment shader, or the texture mapping operation result is to be a minimum or a maximum value derived from the texture lookups, then it may be preferable and/or necessary for the texture mapper first to filter the results of the lookups to provide respective per-lookup values, and to then perform a second step of combining those per-lookup values to provide the texture mapping operation result that is returned to the fragment shader.

The texture mapper can produce the texture mapping operation result that is returned to the fragment shader in any suitable and desired manner (whether using the texels directly, or by first, e.g., filtering each lookup result, before combining the filtered values).

In an embodiment, the texture mapping operation is done, at least in part, by setting the interpolation weights in a texture filtering process that is performed by the texture mapper.

For example, where it is desired to subtract one texture lookup result from another, the interpolation weights for the texture lookup that is being subtracted could be negated (set to negative values) in the filtering operation to achieve the subtraction operation.

Correspondingly, where it is desired to pack selected components of the texture lookup results into the result (value) that is returned to the fragment shader, then the interpolation weights for the different components of the texture lookup results could be set accordingly (e.g. to "1" for the components that are to be included in the result that is to be returned to the fragment shader, and to "0" for the components that are not to be included in the result that is returned to the fragment shader).

Other arrangements would, of course, be possible.

In an embodiment, these operations are performed, at least in part, using a texture filtering circuit (a texture filtering unit)/process of the texture mapper. For example, and in an embodiment, the texture mapper may, and in an embodiment does, include a texture filtering circuit that is operable to perform texture filtering operations, such as bilinear and/or trilinear or other filtering operations. In an embodiment the texture mapping (and filtering) operation comprises the application (multiplication) of texel values (texture data element values) with a corresponding set of interpolation weight values, and then accumulating (summing) the interpolated results.

It will be appreciated from the above that in the embodiments of the technology described herein at least, the texture lookups and texture mapping operations that are performed in the technology described herein comprise at least fetching texels (texture data elements) from a texture for the texture lookups, and performing a texture mapping operation that includes performing (at least) some form of filtering operation using the looked-up texels.

Thus, in an embodiment, the texture mapper comprises (at least) a texture data fetching circuit (circuitry) that is operable to (configured to) fetch texels (texture data values) for a texture lookup (from memory).

The texture data fetching circuit may comprise any desired and suitable processing circuit (circuitry) operable to perform the required functions. This circuit may be in the form of one or more dedicated hardware elements that are configured appropriately, or it may comprise programmable processing circuitry that has been programmed appropriately.

The texture data fetching circuit may further comprise local storage operable to store texels (texture data values) locally to the texture mapper. For example, the local storage unit may comprise a local cache. The cache may be operable to store, and may store, any desired and suitable amount of texture data.

The texture data fetching circuit may be operable to, when performing a texture lookup, first determine whether or not the required texels (data values) are already stored locally (have already been fetched from memory), e.g. are in the local cache. When those texels are not already stored locally (have not previously been fetched from memory and, e.g. are not cached), then the texture data fetching circuit may fetch those texels from memory. The fetched texels (their data values) may then be stored by the texture data fetching circuit in the local cache (e.g. for future re-use by the texture mapper) and/or in other local storage (e.g. for immediate use by the texture mapper). However, when the texels are already stored locally (have already been fetched from memory and, e.g. are cached), then the texture data fetching circuit may fetch those texels from the local cache directly, without sending any request out to the main memory system.

In accordance with the operation in the manner of the technology described herein, the texture data fetching circuit should be, and is in an embodiment, operable to perform plural texture lookups into the same texture in parallel (in response to a texturing instruction of the form of the technology described herein), i.e. to fetch two or more sets of texels (texture data values) from a (same) texture in parallel (as part of the same texel fetching sequence/operation). In an embodiment, all the texels (texture data values) can be and are fetched from the (same) texture in a single processing cycle, but it could be the case that the plural texture lookups into the same texture in parallel take more than one (e.g. two) processing cycles to fetch all the required data, e.g. in the case where the required data requires greater than a threshold number of cache lines that are storing the texture data to be fetched.

In an embodiment, the texture data fetching circuit can fetch (up to) eight texels (so two sets of four texels, or four sets of two texels, for example) (in a single processing cycle).

The texture mapper accordingly in an embodiment also comprises (at least) a texture filtering circuit (circuitry) that is operable to (configured to) perform a texture mapping operation using texture data values (texels) fetched by the texture fetching circuit. The texture filtering circuit (stage) is in an embodiment also operable to (configured to) calculate (e.g. internally) a set of interpolation weight values to be used for a texture mapping operation (and to then perform the texture mapping operation using the set of calculated interpolation weight values and a set of fetched texels (texture data values)).

The texture filtering circuit of the texture mapper can comprise any desired and suitable processing circuit operable to perform the required texture filtering functions. This processing circuit may be in the form of one or more dedicated hardware elements that are configured appropriately, or it may comprise programmable processing circuitry that has been programmed appropriately. In one embodiment, a dedicated texture filtering circuit (hardware) is used.

The texture filtering circuit may comprise circuitry operable to read texels (texture data values) stored locally to the texture mapper (e.g. in the local storage) and then use those texels (their data values) to perform a texture mapping operation. The texture filtering circuit may further comprise circuitry operable to (e.g. internally) calculate interpolation weight values to be used in a texture mapping operation and use those calculated interpolation weight values to perform a texture mapping operation.

In embodiments, the texture filtering circuit is operable to perform, and can perform, a number of different filtering operations, such as bilinear, trilinear and anisotropic filtering (with a texturing request then indicating which filtering operation is to be performed for the texturing operation in question). In an embodiment, the filtering operations that the texture filtering circuit can perform can comprise (at least in an embodiment in the case of bilinear filtering) both generating the weighted average of the set of input texels, but also providing a minimum or maximum filtering result from the set of input texels.

In order to better support the operation in the manner of the technology described herein, the texture filtering circuit is in an embodiment operable to process plural sets of fetched texels in parallel (simultaneously), and in an embodiment however many texels may be fetched by the texture fetching circuitry in parallel. Thus, where the texture fetching circuitry can fetch N texels in parallel, the texture filtering circuit is in an embodiment able to process (filter) N texels in parallel.

Thus, in an embodiment, the texture filtering circuit of the texture mapper can process (filter) (up to) eight texels (so two sets of four texels, or four sets of two texels, for example) in a single processing cycle). In an embodiment the texture filtering circuit of the texture mapper can perform two bilinear filtering operations in one cycle (so using eight texels (two sets of four texels) and eight interpolation weights).

The texture filtering circuit should be, and is in an embodiment, able to perform the particular texture mapping operations (e.g. reduction operations) that may be performed (as discussed above) when executing a texturing instruction in the manner of the technology described herein (and the possible texture mapping operations that may be performed using texturing instructions in the manner of the technology described herein may be, and are in an embodiment, selected and set so as to be supported by the texture filtering circuit).

Thus, the texture filtering circuit may, and in an embodiment does, include appropriate processing circuitry/circuits for the purposes of the technology described herein.

As discussed above, filtering circuitry of the texture filtering circuit, such as filtering circuitry that is provided for use in other texture mapping operations may be, and is in an embodiment, (re)used for texturing instructions and texture mapping operations in the manner of the technology described herein. For example, and in an embodiment, the texture filtering circuit may be operable to set the (e.g. calculated) interpolation weight values for an, e.g. bilinear filtering operation, so as to achieve the desired "reduction" operation using a bilinear filtering circuit of the texture mapper.

However, the texture filtering circuit may, and in an embodiment does, also include circuits or circuitry intended to support the particular texture mapping operations that the technology described herein envisages. For example, the texture filtering circuit may comprise appropriate circuitry/circuits to perform operations in addition to a filtering circuit operable to perform the particular filtering operations discussed above, such as a circuit for generating the minimum or maximum values of outputs from a previous filtering (e.g. bilinear filtering) operation.

In an embodiment, the texture mapper (texture mapping apparatus) is operable to, and operates to, perform a graphics texture mapping operation for a set of plural threads that are executing the same graphics texturing instruction in a fragment shader program together (in parallel). In other words, the texture mapping operation is performed in parallel for a set of plural threads that are executing the same texturing instruction (but that will each be sampling the texture on their own respective set of (texture) coordinates (which may be different to or the same as the coordinates for one or more of the other threads in the set)).

In an embodiment, the texture mapping operations are performed for sets of four threads in parallel, and in an embodiment for four threads that correspond to sampling positions in a 2×2 pattern (thus for "quads" of sampling positions).

In this case, the texture mapping operation for each thread of the set of plural threads (e.g. quad) that is being processed together will be performed in the manner of the technology described herein (and the texture mapper will be configured to be able to operate in the manner of the technology described herein for plural (e.g. four) threads in parallel).

The texture mapper (texture mapping apparatus) can otherwise include any other suitable and desired circuits, units and stages for performing texture mapping operations.

For example, the texture mapper in an embodiment also comprises a coordinate computation circuit that is operable to determine the texel positions (the texel indices) in a texture to be fetched for a texturing operation from the sampling position coordinates for which to perform the texture mapping operation indicated in a texturing request.

This coordinate computation circuit is in an embodiment in the form of a plurality of coordinate computation pipelines (for each thread (sampling position) that can be processed in parallel), that are each operable to process one sampling position coordinate when determining the texels (the texel indices) to be fetched for a texturing operation for the sampling position in question.

In an embodiment, the coordinate computation circuit comprises four coordinate computation pipelines that operate in parallel (per thread), as that will then allow respective pairs of the coordinate computation pipelines to handle 2D (two dimensional) coordinates for two sampling positions (or 1D coordinates for four sampling positions) in parallel (simultaneously).

The texture mapper may also comprise an appropriate texturing instruction receiving circuit that may, for example, also be operable to trigger the fetching of texturing control data (input parameters), such as the texture descriptors discussed above, from the memory.

The technology described herein also extends to the texture mapper per se.

Thus, a further embodiment of the technology described herein comprises a method of operating a texture mapping apparatus operable to perform graphics texture mapping operations in response to requests for graphics texture mapping operations from a fragment shader, the method comprising:

the texture mapping apparatus, in response to a request from a fragment shader to perform a graphics texture mapping operation for an execution thread that is executing a graphics texturing instruction in a shader program:
    performing a graphics texture mapping operation, including:
        performing plural lookups from the same texture in parallel;

generating a texture mapping operation result using the results of the plural lookups from the same texture; and returning the generated texture mapping operation result to the fragment shader.

A further embodiment of the technology described herein comprises a texture mapping apparatus operable to perform graphics texture mapping operations in response to requests for graphics texture mapping operations from a fragment shader;

wherein:

the texture mapping apparatus is operable to, in response to a request from a fragment shader to perform a texture mapping operation for an execution thread that is executing a graphics texturing instruction in a shader program:

perform a graphics texture mapping operation including:
performing plural lookups from the same texture in parallel;
generating a texture mapping operation result using the results of the plural lookups from the same texture; and
returning the generated texture mapping operation result to the fragment shader.

As will be appreciated by those skilled in the art, these embodiments of the technology described herein can, and in an embodiment do, include any one or more or all of the features of the technology described herein described herein, as appropriate.

The texture mapper and texture mapping apparatus may be part of a graphics processor (as discussed above), but it could also be a co-processor of a CPU, for example (i.e. coupled with a CPU that executes the fragment shader program), if desired.

Once the texture mapper has performed the desired texture mapping operation using the results of the plural lookups, it returns the texture mapping operation result to the fragment shader.

The fragment shader can then use the returned texture mapping operation result as desired, e.g. to apply the result (e.g. a colour) to a sampling position (and fragment) being rendered, for or in other processing, and/or output a fragment shading result that used the result of the texture mapping operation, such as a fragment-shaded sampling position, e.g. for further processing, storage, transmission, and/or display.

Although the technology described herein has been described above primarily with reference to the performance of a texture mapping operation for a given thread that is executing the shader program, in practice when generating a render output, a given texture mapping operation (and instruction) will be repeated for plural threads, e.g. across the entire area of the render output being generated. Thus the technology described herein is in an embodiment performed in respect of plural threads that are executing a fragment shader program, such as, and in an embodiment, for each of plural threads that is to execute a fragment shader program that includes the appropriate texturing instruction when generating a render output.

The operation in the manner of the technology described herein is triggered by including an appropriate texturing instruction in a shader program to be executed by the fragment shader of the graphics processor. Instructions of the type that trigger operation in the manner of the technology described herein will be recognised by the fragment shader as such texturing instructions, and the fragment shader will then operate to send an appropriate request (instruction) to the texture mapper to perform a texture mapping operation in the manner of the technology described herein (and return the result of the texturing operation to the fragment shader for further processing and/or other use).

The inclusion of a texturing instruction of the form of the technology described herein in a fragment shader program to be executed by a fragment shader of a graphics processor can be performed in any suitable and desired manner.

In an embodiment, texturing instructions of the form of the technology described herein are included in fragment shader programs to be executed by a fragment shader of the graphics processor by the compiler for the fragment shader (and thus the processing circuitry operable to include the texturing instructions in a fragment shader program comprises a compiler for the fragment shader (of the overall graphics processing system)).

The compiler can in an embodiment include a texturing instruction of the technology described herein in a fragment shader program either in response to an explicit instruction to that effect in a shader program to be compiled, or in response to identifying program expressions that relate to and/or that require appropriate texturing operations in a shader program to be compiled.

Thus, in an embodiment, the overall data processing system operation allows an application programmer to explicitly specify that a texture mapping operation in the manner of the technology described herein is to be performed, e.g. by including an appropriate program expression for the texturing operation in an application program to be executed in a fragment shader program to be executed by the graphics processor.

This could be achieved, for example, and in an embodiment, by providing an API extension that includes one or more specific program expressions for texturing operations in the manner of the technology described herein (such that an application program can include a specific program expression when a texturing operation in the manner of the technology described herein is desired). In this case, the appropriate shader compiler (the fragment shader compiler) should be operable to recognise the specific texturing operation program expression(s) and compile those expression(s) to binary instruction(s) for the fragment shader so as to cause a texture mapping operation to be performed using the texture mapper of the graphics processor in line with the technology described herein.

In an embodiment, texturing instructions in the form of the technology described herein can be, and in an embodiment are, included in the (compiled) shader program code that is sent to the fragment shader by the compiler without the need for an "explicit" program expression to that effect, such as, and in an embodiment, in response to (appropriate) program expressions for texture mapping operations in a fragment shader program being compiled (but which are not (specifically) for texture mapping operations in the manner of the technology described herein). In this case, the texturing instructions in the manner of the technology described herein may not be directly exposed to an application programmer, but the compiler for the fragment shader will be, and is in an embodiment, operable to include such texturing instructions in a fragment shader program to be executed (where it is appropriate to do that).

In this case, the compiler is in an embodiment operable to identify (plural) program expressions in a shader program provided to the compiler that are performing lookups from the same texture, and then combine those plural expressions (e.g. two lookups from the same 2D texture, or four lookups from the same 1D texture) into a single texturing instruction in the manner of the technology described herein (i.e. to replace those program expressions with an instruction to cause the texturing operations to be performed using a (single) texturing instruction in the manner of the technology described herein). Thus the fragment shader compiler is in an embodiment operable to analyse a shader program to identify lookups from the same texture, and then to combine two (or more) of those lookups from the same texture into a single texturing instruction in the manner of the technology described herein.

As well as identifying program expressions that are performing lookups from the same texture, the compiler could also take account of other criteria or conditions when determining whether to replace plural texture operations in a shader program being compiled with a single texturing instruction in the manner of the technology described herein.

For example, the compiler could, in an embodiment does, also take account of the texture mapping operation that is being performed in relation to the lookups from the same texture (and to only combine the lookups into a single texturing instruction in the manner of the technology described herein when all the lookups are performing the same (or sufficiently similar) texture mapping operation (e.g., and in an embodiment, are (at least) using the same filtering mode). (Correspondingly, the compiler is in an embodiment operable to only combine the plural lookups into the same texture into a single texture instruction in the manner of the technology described herein where a texture instruction in the manner of the technology described herein supports a texture mapping operation that corresponds to how the looked-up texture values are to be used in the shader program.)

The compiler could also, for example, take account of the level of detail (LOD) mode that is being used and whether any additional variable parameters in addition to the texture coordinate being sampled are needed (such as a shadow map reference value, a variable array index, a variable texel offset, a variable LOD or LOD bias, etc.) (and, e.g., only combine the lookups into a single texturing instruction in the manner of the technology described herein where the same LOD mode and no additional variable parameters beside the texture coordinate sample are being used).

As part of this operation, the compiler in an embodiment also (where possible) analyses the shader program to determine how the looked-up texture values are to be used in the shader program, and then selects the texture mapping operation that the instruction in the manner of the technology described herein is to perform accordingly. Thus the compiler will in an embodiment analyse program expressions following the texture lookups in the shader program to determine the use of the looked-up texture values, and then select a texture mapping operation to be performed using the texturing instruction in the manner of the technology described herein accordingly (i.e. to select the appropriate texture mapping (reduction) operation that can be performed using the texturing instruction in the manner of the technology described herein, as discussed above).

In the case, e.g., where the compiler identifies that the shader program is to perform some form of arithmetic operation using the results of the texture lookups, then in an embodiment, the compiler uses a texturing instruction in the manner of the technology described herein that will perform the corresponding arithmetic operation using the results of the texture lookups (as discussed above). In this case, the texture mapper will accordingly be triggered to, in effect, perform some or all of the arithmetic operation using texture lookups itself, such that the fragment shader would not then itself need to perform those arithmetic operations (that are being performed by the texture mapper). In this case therefore, the compiler for the fragment shader is in an embodiment also operable to omit from the compiled shader program for execution by the fragment shader, any arithmetic operations that will be (instead) performed by the texture mapper as part of the texturing instruction operation.

The compiler may also, and in an embodiment does also, operate to ensure that instruction in the manner of the technology described herein produces the same result(s) as would be produced by executing the original texturing instructions that are being replaced, and/or will comply with any graphics API and/or standards requirements.

The technology described herein also extends to this operation of the compiler.

Thus, a further embodiment of the technology described herein comprises a method of compiling a fragment shader program for execution by a fragment shader of a graphics processor, the method comprising:

receiving a fragment shader program to be compiled;

analysing the received fragment shader program to identify whether the fragment shader program includes plural different program expressions that each perform a texture mapping operation that performs a lookup into the same texture; and in response to identifying plural different program expressions each performing a texture mapping operation that performs a lookup into the same texture in the shader program:

replacing two or more of the identified plural different program expressions with a single combined texturing instruction that when executed by the fragment shader will cause the fragment shader to send a request to the texture mapper to perform a graphics texture mapping operation in which the texture mapper will perform plural lookups from the same texture in parallel.

A further embodiment of the technology described herein comprises a compiler for compiling a fragment shader program for execution by a fragment shader of a graphics processor, the compiler being configured to:

receive a fragment shader program to be compiled;

analyse the received fragment shader program to identify whether the fragment shader program includes plural different program expressions that each perform a texture mapping operation that performs a lookup into the same texture; and to in response to identifying plural different program expressions each performing a texture mapping operation that performs a lookup into the same texture in the shader program:

replace two or more of the identified plural different program expressions with a single combined texturing instruction that when executed by the fragment shader will cause the fragment shader to send a request to the texture mapper to perform a graphics texture mapping operation in which the texture mapper will perform plural lookups from the same texture in parallel.

As will be appreciated by those skilled in the art, these embodiments of the technology described herein can, and in an embodiment do, include any one or more or all of the features of the technology described herein described herein. Thus, the texturing instruction that is included in the compiled fragment shader program can in an embodiment take the form of any of the forms discussed above, and trigger any of the texture mapping operations discussed above.

Similarly, as well as identifying program expressions that are performing lookups from the same texture, the compiler could also take account of other criteria or conditions when determining whether to replace plural texture operations in a shader program being compiled with a single texturing instruction in the manner of the technology described herein, such as the texture mapping operation that is being performed in relation to the lookups from the same texture.

Similarly, the compiler is in an embodiment also operable to analyse the shader program being compiled to identify any arithmetic operations that may be performed using the results of the texture lookups in the shader program, and to then (when appropriate) configure the texturing instruction that is included in the compiled shader program to perform some or all of those arithmetic operations as well (and to then replace both the texture lookup instructions and the arithmetic operation instructions in the shader program with the texturing instruction in the manner of the technology described herein).

The compiler for the fragment shader can operate as desired, e.g., and in an embodiment, as part of the driver for the graphics processor that is, e.g., and in an embodiment, executing on a host processor of the overall data (graphics) processing system that the graphics processor is part of or associated with. Correspondingly, the compiler may identify the presence of appropriate texturing operations in a fragment shader program to be executed at any desired stage of the compilation process, such as application program expressions, intermediate (partially compiled) instructions, and/or compiled (binary) instructions.

Other arrangements would, of course, be possible.

The operation in the manner of the technology described herein can be used for any suitable and desired form of texturing operation and graphics (or other) processing operation that may be performed using textures.

The textures that the technology described herein is used with can take any suitable and desired form. Each texture will comprise an array of texels (texture data elements), such as a one dimensional or two dimensional array of texels, with each texel (texture data element) in the texture having an associated data value, which data value is in an embodiment a multicomponent (multidimensional) data value. In an embodiment, each texel value is a four component value (and the various processing stages and circuits of the graphics processor and texture mapper are correspondingly configured to be able to handle four component (texel) data values). Other arrangements would, of course, be possible.

In the case where the graphics processor and texture mapper, etc., is configured to handle data values (e.g. texel values) of a particular size (such as four component texels), then where the texture that is being processed in the manner of the technology described herein uses data values of a smaller size (such as may, for example, be the case where the texture is simply representing depth values, rather than "full" colour values), then any data value components for which a value is not specified in the texture itself are in an embodiment set to (and/or assumed to be) a default value, such as "0" or "1" (as appropriate). Any "missing" data value components could also or instead be taken account of by setting the interpolation weights that are used in the texel filtering/processing process appropriately, if desired.

Other arrangements would, of course, be possible.

The technology described herein can be used for and with any desired form of texture data that can be processed by a fragment shader program. Thus it can be used where the textures represent appropriate colour values (e.g. RGBα values) (and in one embodiment this is the case), such as images, but also in the case where the texture data represents other graphics processing parameters and data that may be used when generating a render output, such depth values, etc., or in the case where the texture data represents other (non-graphics) processing parameters and data (e.g. where the texture processing is being used to perform other) (non-graphics) data processing operations.

For example, the technology described herein can be used with textures that represent depth values to perform operations such as deriving tangents or normals, and/or gradients, at sampling positions within a render output being generated, and/or when generating lighting effects when generating the render output.

It may also be used, for example, for averaging values of different sampling positions and/or for generating bounding boxes of legal values (the range of legal values for a texture), e.g. for anti-aliasing purposes.

For example, in the case where the texture represents appropriate colour values, the operation in the manner of the technology described herein can be used to return average colour values for plural sampling positions and/or to derive ranges of legal values for sampling positions, e.g. for anti-aliasing purposes.

The technology described herein can also be used with textures that do not represent (e.g. approximately) graphics processing parameters, such as where the textures represent values for mathematical functions (e.g. that can be represented as 2D arrays), with the fragment shader and texture mapping operation in the manner of the technology described herein then being used to generate results for the mathematical function in question using the textures representing the mathematical functions.

Other arrangements would, of course, be possible.

The graphics processor and texture mapping apparatus of the, technology described herein may be, and typically will be, part of an overall graphics/data processing system. Thus, the technology described herein also extends to a data/graphics processing system having a graphics processor and/or texture mapping apparatus as described herein.

Thus, as will be appreciated, embodiments may be implemented in a data/graphics processing system comprising a memory and a graphics processing unit (GPU) (a graphics processor) comprising a texture mapping apparatus as described herein.

In an embodiment, the data/graphics processing system may further include a host processor that executes applications that can require data or graphics processing by the graphics processor and that instruct the graphics processor accordingly (e.g. via a driver for the graphics processor). The system may further include appropriate storage (e.g. memory), caches, etc.

The data/graphics processing system and/or graphics processor and/or texture mapping apparatus may also comprise, and/or be in communication with, one or more memories and/or memory devices that store the data (such as the textures) described herein, and/or that store software for performing the processes described herein. The graphics/data processing system and/or graphics processor and/or texture mapping apparatus may also be in communication with a host microprocessor, and/or with a display for displaying images based on the data generated.

The fragment shader of the graphics processor can be any suitable and desired programmable processing stage that executes fragment shader programs on input data values to generate a desired set of output data (in this case shaded and rendered fragment data) for processing by the rest of the graphics processor and/or for output. The fragment shader will perform fragment processing by executing a program or programs for each sampling position in a graphics (render) output being generated. Each sampling position will be processed by means of an execution thread that will execute the fragment shader program in question for the sampling position in question. In an embodiment, the fragment shader is operable to process threads as respective groups of threads (warps) in lockstep. In an embodiment, each thread group (warp) contains sixteen threads and comprises four "quads" of four threads each. Other arrangements would, of course, be possible.

The fragment shader will be implemented as an appropriate programmable processing circuit (circuitry) (as a "shader core"). There may be a separate programmable processing circuit provided for the fragment shader, or the fragment shader may be executed on the same programmable processing circuit as other shaders of the graphics processor.

The fragment shader will act as the renderer for the graphics processor. The graphics processor may include other rendering stages and circuits, in addition to the fragment shader, if desired (i.e. such that the overall rendering process comprises both executing fragment shader programs and performing other rendering operations).

As well as the fragment shader (and any other rendering stages/units) and texture mapper, the graphics processor may include any one or more or all of the processing stages that a graphics processor (processing pipeline) can normally include. Thus, for example, the graphics processor may include a primitive setup stage, and/or a rasteriser.

The graphics processor (processing pipeline) may comprise one or more other programmable shading stages, such as one or more or all of, a vertex shading stage, a hull shader, a tessellation stage (e.g. where tessellation is performed by executing a shader program), a domain (evaluation) shading stage (shader), and a geometry shading stage (shader), as well as a fragment shader.

The graphics processor (processing pipeline) may also contain any other suitable and desired processing stages that a graphics processing pipeline may contain such as a depth (or depth and stencil) tester(s), a blender, a tile buffer or buffers, a write out unit etc.

The technology described herein can be used in and with any suitable and desired graphics processing system and processor. The technology described herein is particularly suitable for use with tiled renderers (tile-based graphics processing systems). Thus, in one embodiment, the graphics processor (processing pipeline) is a tiled-based graphics processor (processing pipeline).

The technology described herein can be used for any form of output that a graphics texture mapper and graphics processor may be used to generate. In one embodiment it is used when a graphics processor is being used to generate images for display, but it can be used for any other form of graphics processing output, such as (e.g. post-processed) graphics textures in a render-to-texture operation, etc., that a graphics processor may produce, as desired. It can also be used when a texture mapper, graphics processor, etc., is being used to generate other (e.g. non-image or non-graphics) outputs.

In one embodiment, the various functions of the technology described herein are carried out on a single data or graphics processing platform that generates and outputs the required data, such as processed image data that is, e.g., written to a frame buffer for a display device.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

As discussed above, the technology described herein relates to texture mapping in graphics processors.

Figure 6:
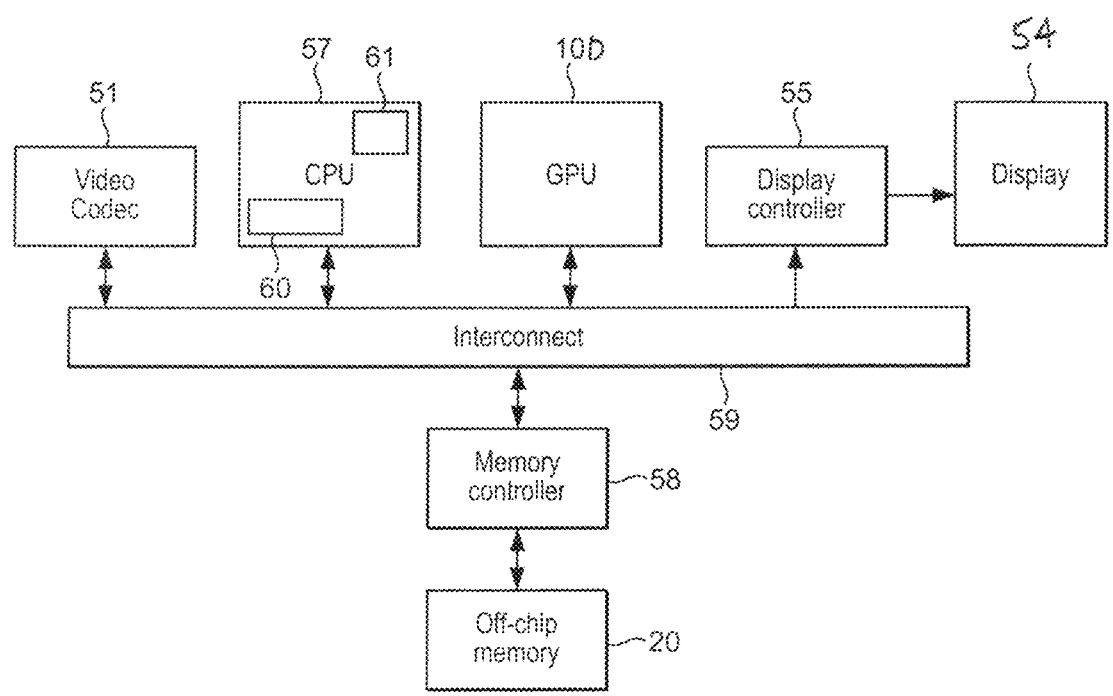
FIG. 6 shows an exemplary data processing system in which the technology described herein may be implemented.

FIG. 6 shows an exemplary data processing system in which the technology described herein and the present embodiments may be implemented.

The exemplary data processing system shown in FIG. 6 comprises a host processor comprising a central processing unit (CPU) 57, a graphics processor (GPU) 100, a video codec 51, a display controller 55, and a memory controller 58. As shown in FIG. 6, these units communicate via an interconnect 59 and have access to off-chip memory 20. In this system the GPU 100, video codec 51, and/or a CPU 57 will generate frames (images) to be displayed, and the display controller 55 will then provide the frames to a display 54 for display.

In use of this system, an application 60, such as a game, executing on the host processor (CPU) 57, will, for example, require the display of frames on the display 54. To do this, the application 60 will submit appropriate commands and data to a driver 61 for the graphics processor 100 that is executing on the CPU 57. The driver 61 will then generate appropriate commands and data to cause the graphics processor 100 to render appropriate frames for display and to store those frames in appropriate frame buffers, e.g. in the main memory 20. The display controller 55 will then read those frames into a buffer for the display from where they are then read out and displayed on the display panel of the display 54.

Figure 2:
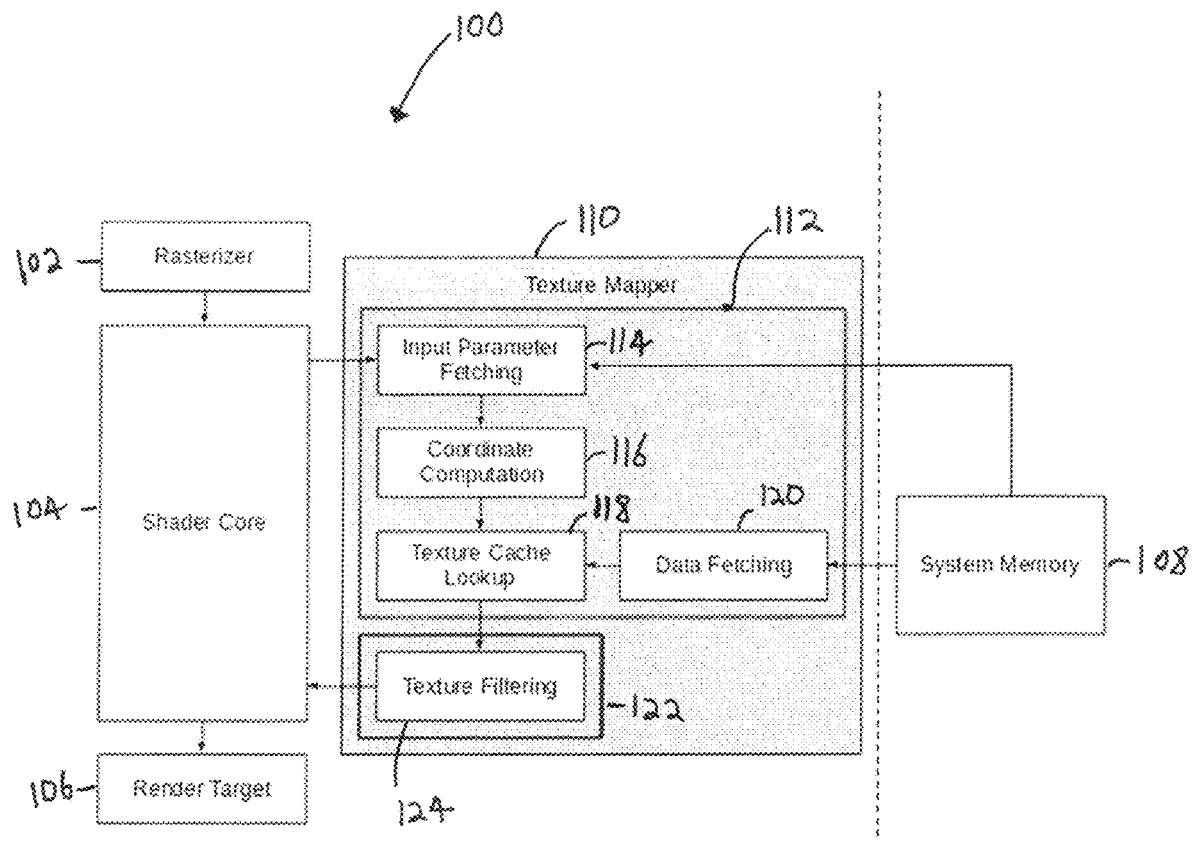
FIG. 2 shows schematically a graphics processor having a texture mapper in an embodiment of the technology described herein.

FIG. 2 shows schematically elements of a graphics processor (graphics processing unit (GPU)) 100 that are relevant to the operation of the present embodiments. As will be appreciated by those skilled in the art, there may be other elements of the GPU 100 that are not illustrated in FIG. 2.

In the present embodiment, the GPU 100 is a tile-based graphics processor. However, other arrangements are possible.

As shown in FIG. 2, the GPU 100 comprises data processing circuitry that implements a graphics processing pipeline. The pipeline includes, inter alia, a rasterizer 102 and a renderer in the form of a programmable (fragment) shader core 104. The pipeline uses a buffer 106 (e.g. in external memory 108) for storing an output array (e.g. frame or image to be displayed). The GPU 100 is in communication with the external memory 108, but the external memory 108 does not form part of the GPU 100 and instead forms part of an overall host data processing system that comprises, inter alia, the GPU 100 and memory 108.

The memory 108 will store, inter alia, graphics textures to be used by the GPU 100 when performing texture mapping operations. The memory 108 may, e.g., be a disk drive or other storage medium (e.g. a hard disk, a raid array of hard disks or a solid state disk) of or accessible to the host system in which the GPU 100 is located, and may be an internal storage medium of the host system, or an external or removable storage medium.

The GPU 100 further comprises a texture mapper (a texture mapping apparatus) 110. As shown in FIG. 2, the texture mapping apparatus 110 comprises a texture fetching circuit 112, which in this embodiment includes an input parameter fetching unit 114, a coordinate computation unit 116, a texture cache lookup unit 118, and a data fetching unit 120. The texture mapping apparatus 110 further comprises a texture filtering unit 122, which in this embodiment comprises a texture filtering circuit 124.

The arrows in FIG. 2 indicate the main ways in which data flows between the various components of the GPU 100 and the memory 108. There may also be other communication routes or directions that are not indicated.

The rasterizer 102 can receive, as its input, primitives (e.g. triangles) to be used to generate a render output, such as a frame to be displayed, and rasterizes those primitives into individual graphics fragments for processing. To do this, the rasterizer 102 rasterizes the primitives to sample points representing the render output, and generates graphics fragments representing appropriate sampling positions for rendering the primitives. The fragments generated by the rasterizer 102 are then sent onwards to the (fragment) shader core (renderer) 104 for shading.

The fragment shader 104 is a programmable processing stage that executes shader programs on input data values to generate a desired set of output data (in this case shaded and rendered fragment data) for processing by the rest of the graphics processor and/or for output. The fragment shader will perform fragment shading processing by executing a program or programs for each sampling position in a graphics (render) output being generated. Each sampling position will be processed by means of an execution thread that will execute the fragment shader program in question for the sampling position in question.

The fragment shader will be implemented as an appropriate programmable processing circuit (circuitry) (as a "shader core"). There may be a separate programmable processing circuit provided for the fragment shader, or the fragment shader may be executed on the same programmable processing circuit as other shaders of the graphics processor.

In the present embodiments, the fragment shader is configured such that (and operates such that) execution threads may be grouped together into thread groups, in which the threads of the group are executed in lockstep, one instruction at a time. In this way, it is possible to share instruction fetch and scheduling resources be all the threads in the group. (Other terms used for such thread groups include "warps" and "wave fronts". For convenience, the term "thread group" will be used herein, but this is intended to encompass all equivalent terms and arrangements, unless otherwise indicated.)

In this embodiment, the shader core 104 can execute shader programs for the fragments issued by the rasterizer 102 in order to render (shade) the fragments. The shader programs may have texturing instructions for texture mapping operations that are required to be executed by the texture mapping apparatus 110.

When a texturing instruction is encountered by the shader core 104, a texture mapping operation request is sent from the shader core 104 to the texture mapping apparatus 110, requesting the texture mapping apparatus 110 to perform a texture mapping operation. After the texture mapping apparatus 110 has finished its texture mapping processing (carrying out the texture mapping operation), the final result is sent back to the fragment shader core 104 in a response message for use when shading the fragment in question.

The texture mapping apparatus 110 includes suitable processing circuitry to follow texturing instructions. This processing circuitry may be in the form of one or more dedicated hardware elements that are configured appropriately, or it may comprise programmable processing circuitry that has been programmed appropriately. In this embodiment, a dedicated hardware texture mapping apparatus 110 is used.

When instructed by the shader core 104 to perform a texture mapping operation, the texture mapping apparatus 110 reads textures from the memory 108 (as required), performs the texture mapping operation, and returns a (e.g. RGBα) colour sampled from the texture back to the shader core 104.

As part of this processing, the input parameter fetching unit 114 receives the texturing instruction message from the shader core 104 indicating the texture or textures to be used (e.g. a texture field may be provided that includes a texture descriptor (TXD)), the particular type (e.g. bilinear, trilinear, etc.) of texture mapping operation to perform (e.g. a sampler field may be provided that includes a sampler descriptor (SMD)), and the sampling position coordinates at which to perform the texture mapping operation (e.g. given in a normalized coordinate-system where (0.0, 0.0) is the top-left corner of the texture and (1.0, 1.0) is the bottom-right corner of the texture).

The texture descriptor (TXD) which is used when requesting a texture mapping operation to be performed may, e.g., indicate one or more surface descriptors (SFD) for one or more input arrays or surfaces (textures, images or other arrays) to be used in a texture mapping operation. Each SFD may indicate the parameters for a data array to be used in a texture mapping operation.

The sampler descriptor (SMD) which is used when requesting a texture mapping operation may indicate the filtering method (e.g. bilinear, trilinear, etc.) and other parameters to be used for the texture mapping operation.

The coordinate computation unit 116 then determines, from the sampling position coordinates, the texels (the texel indices) in the texture to be looked up from the data fetching unit 120.

The texture cache lookup unit 118 then checks whether the required texture data (the required texels) is already stored in a cache of the data fetching unit 120 and, if not present, fetches the texture data (the texels) into the texture mapping apparatus 110. For a bilinear lookup, texture data from four texels are read from a 2×2 texel region of the texture in memory 108. For a trilinear lookup, texture data from two sets of four texels are read from two 2×2 texel regions of respective texture "mipmaps" in memory 108.

The texture filtering unit 124 then reads in the four texels for a bilinear lookup, determines interpolation weight values and computes an interpolated result from the texture data values for the sampling position in question. In the case of trilinear interpolation, the results of two bilinear lookups are combined into a result for the sampling position in question. The result is then output to (returned to) the shader core 104.

The "shaded" fragment from the shader core 104 is then stored as part of the output render target in the buffer 106, e.g. in the memory 108, e.g. for subsequent post-processing or display.

Other arrangements for the graphics processor and system would, of course, be possible.

In the present embodiments, and in accordance with the technology described herein, a shader program to be executed by the fragment shader 104 can include a texturing instruction (TEX_MULTI) that will cause the texture mapper 110 to perform plural lookups from the same texture in parallel and then return a texture mapping operation result to the fragment shader based on (using) those plural lookups from the same texture.

The texturing instruction uses a 4D texture coordinate (vector), x, y, z, w, as an input coordinate, and also indicates the texture mapping operation that is to be performed by the texture mapper using the looked-up texture data.

In particular, in the present embodiments, the multi-lookup texturing instruction is also configured to trigger the texture mapper to perform a texture mapping operation using the looked-up texels that will "reduce" the total number of data values to be returned to the fragment shader to one four-component vector. This is indicated in the texturing instruction itself, by indicating a texture mapping operation mode to be used when executing the texturing instruction.

In the present embodiments, such a texturing instruction can be used to trigger either two parallel lookups from a 2D texture, or four parallel lookups from a 1D texture.

In the case of making four lookups from a 1D texture, the input coordinate x, y, z, w is used to generate four separate lookups into a 1D texture, a first lookup A that uses the x coordinate, a second lookup B that uses the y coordinate, a third lookup C that uses the z coordinate and a fourth lookup D uses the w coordinate. Each lookup will fetch two texels from the texture, which can then be linearly filtered to return, e.g. in the case of an rgba texture, a total of four, four component data values (colours) from an rgba texture: A.rgba, B.rgba, C.rgba and D.rgba.

As making four lookups from a 1D texture, will, in effect produce four, four component data values (colours) from the 1D texture, the texturing instruction can indicate that these four data values should be processed by the texture mapper in one of three different ways, to generate a resulting four component vector (data value) for returning to the fragment shader, namely:

pack_lo: result=vec4(A.r, B.r, C.r, D.r);
pack_hi: result=vec4(A.a, B.a, C.a, D.a);
pack_seq: result=vec4(A.r, B.g, C.b, D.a);

The "pack_seq" mode could be used, for example, to lookup values in textures that represent (that comprise) lookup tables for mathematical functions, such as sinus functions, gamma conversion functions, etc.

In the case of performing two texture lookups from a 2D texture in parallel, the input coordinates x, y, z, w in the instruction are used to make two lookups from the 2D texture, a first lookup A that uses coordinates x, y and a second lookup B that uses coordinates z, w. Each lookup will fetch four texels from the texture, which can then be bilinearly filtered to return, e.g. in the case of an rgba texture, a total of two, four component data values (colours): A.rgba and B.rgba.

As making two lookups from a 2D texture, will, in effect, produce two, four component data values (colours) from the 2D texture, the texturing instruction can indicate that these two data values should be processed by the texture mapper in one of seven different ways, to generate a resulting four component vector (data result value) for returning to the fragment shader namely:

pack_lo: result=vec4(A.rg, B.rg);
pack_hi: result=vec4(A.ba, B.ba);
pack_seq: result=vec4(A.rg, B.ba);
add: result=A.rgba+B.rgba
sub: result=A.rgba−B.rgba
min: result=min(A.rgba, B.rgba)
max: result=max(A.rgba, B.rgba)

In this case, the "add" operation mode could be used, for example, where it is desired to determine the average of plural texture samples. The "sub" (subtract) mode could be used e.g., when determining tangents, normals or gradients for sampling positions, e.g. using textures that represent heights or depths of objects and positions. The "min" and "max" filtering modes could be used, for example, to derive ranges (bounding boxes) of values within a texture, for example for anti-aliasing purposes. The "pack_low" mode could be used, for example, to retrieve depth values from textures containing depth information for use, for example, for lighting effects.

Figure 3:
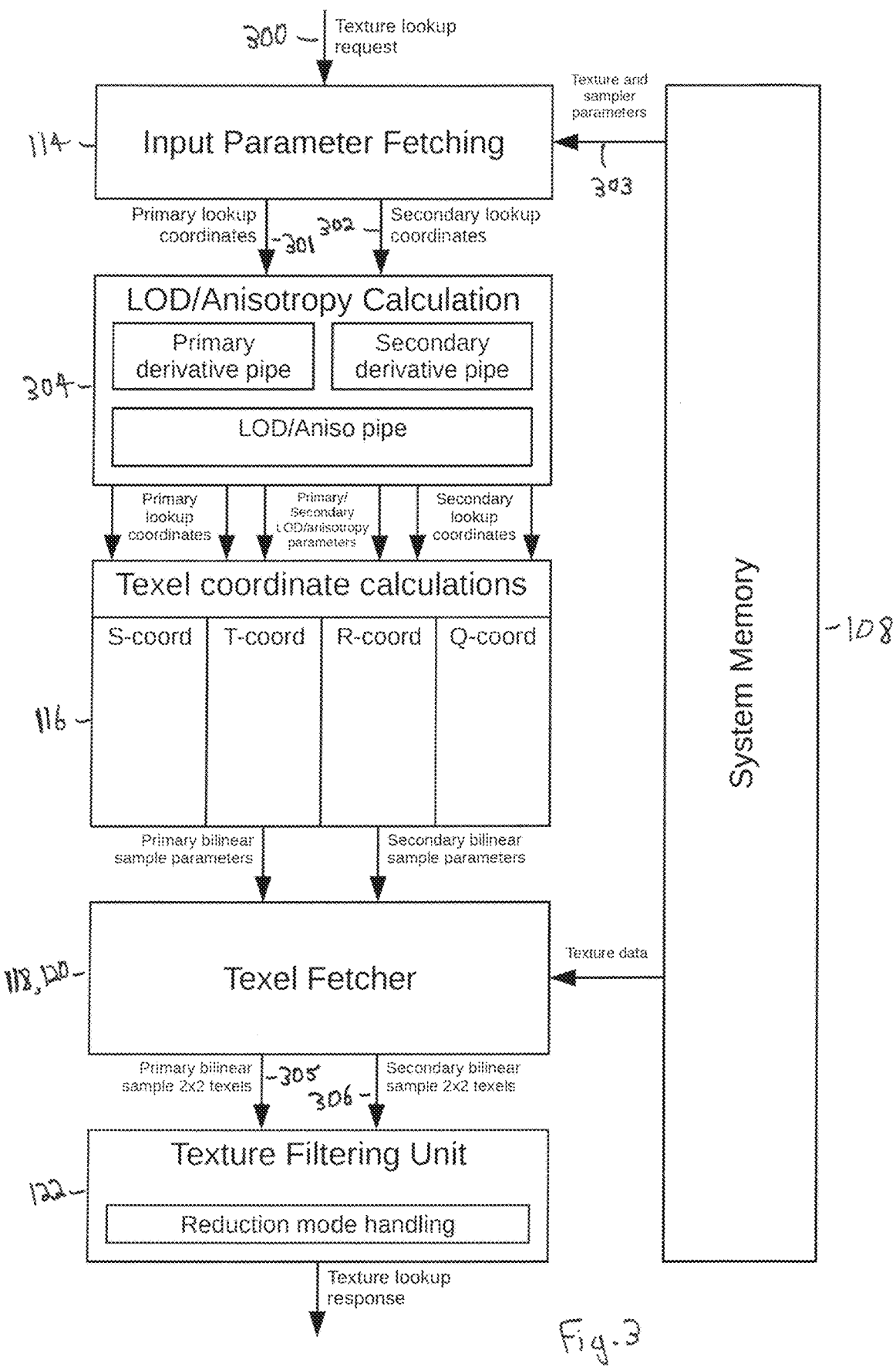
FIG. 3 shows schematically and in more detail a texture mapping apparatus according to an embodiment of the technology described herein.

FIG. 3 shows an embodiment of the texture mapper (texture mapping apparatus) 110 that is configured to better support the execution of texturing instructions in the manner of the technology described herein in further detail.

As is shown in FIG. 3, the input parameter fetching unit 114 of the texture mapping apparatus 110 will receive a texturing request 300 in the form of the present embodiments from the shader core 104.

This texture lookup request 300 will include, as discussed above, a four component input coordinate, which the input parameter fetching unit 114 will convert into either two or four texture lookup coordinates as discussed above. FIG. 3 shows the generation of two texture lookup coordinates, 301, 302, as an example.

As shown in FIG. 3, the input parameter fetching unit 114 also retrieves input parameters (control data) 303 for the texture mapping operation from memory 108.

The two sets of lookup coordinates (in this example) 301, 302 are then passed to an LOD (level of detail)/Anisotropy calculation unit 304, which performs any necessary derivative and LOD/anisotropy calculations. The LOD/Anisotropy unit 304 includes two derivative pipelines, to better support performing plural lookups from the same texture in parallel.

The two sets of lookup coordinates (and of LOD/anisotropy parameters, if required) are then passed to the coordinate computation unit 116 where the actual indices for the texels to be fetched for each lookup are generated.

As shown in FIG. 3, the coordinate computation unit 116 is, in this embodiment, in the form of four coordinate computation pipelines (per thread), that are each operable to process one sampling position coordinate when determining the texels (the texel indices) to be fetched for a texturing operation for a lookup, as that will then allow respective pairs of the coordinate computation pipelines to, e.g., handle 2D coordinates for two lookups in parallel (simultaneously).

The coordinate computation unit 116 accordingly generates, in this example, two sets of four texel indices to fetch (to make two bilinear lookups in parallel), which are then provided to the texel fetching unit (circuit) 118, 120 so that the required texels for each lookup can be fetched.

In this embodiment, the texel fetcher 118, 120 is configured to be able to fetch eight texels in one pass (in parallel) and so can fetch the two sets of four texels 305, 306 needed for the two bilinear lookups (in this example) in parallel, as shown in FIG. 3.

The two sets of four texels (for the bilinear lookups) (in this example) are then provided to the texture filtering unit 122 for processing.

The texture filtering unit 122 includes appropriate circuitry to perform texture filtering operations, such as to calculate interpolation weight values for a texture filtering operation, and to multiply respective texel values by their respective weight values and combine the results of the multiplications to provide an output filtered value.

In the present embodiment, the texture filtering unit 122 includes appropriate filtering circuitry (circuit) to perform two bilinear filtering operations in parallel. In the present embodiment, each bilinear filtering operation can provide a weighted average of four texels (thus eight weight values are applied to eight texel values in one cycle of operation), or can provide a minimum or a maximum filter of four input texels.

The texture filtering unit 122 also includes further circuits operable to, for example, determine the minimum and maximum of bilinearly filtered texels, so as to support the texture mapping operation modes of the present embodiments discussed above.

The texture filtering unit 122 could perform a desired texture mapping operation mode in the embodiments of the technology described herein using the filtering circuits and min/max circuits, as desired. For example, where the texture mapping operation can be performed in a single cycle using the filtering circuit, then that could be done. Alternatively, two cycles through the texture filtering unit 122 may be performed, if required (for example to first bilinearly filter the texels from the plural lookups, and then to perform a minimum or maximum operation using the bilinear filtering results (or vice-versa)).

The interpolation weights when performing the, e.g. bilinear filtering, may be set appropriately to achieve the desired operation in the manner of the present embodiment. For example a "subtraction" operation may be achieved by negating the interpolation weights of the secondary bilinear lookup prior to multiplying the texels and weights together.

Other arrangements would, of course, be possible.

The result from texture filtering unit 122 is then output to (returned to) the shader core 104.

Figure 4:
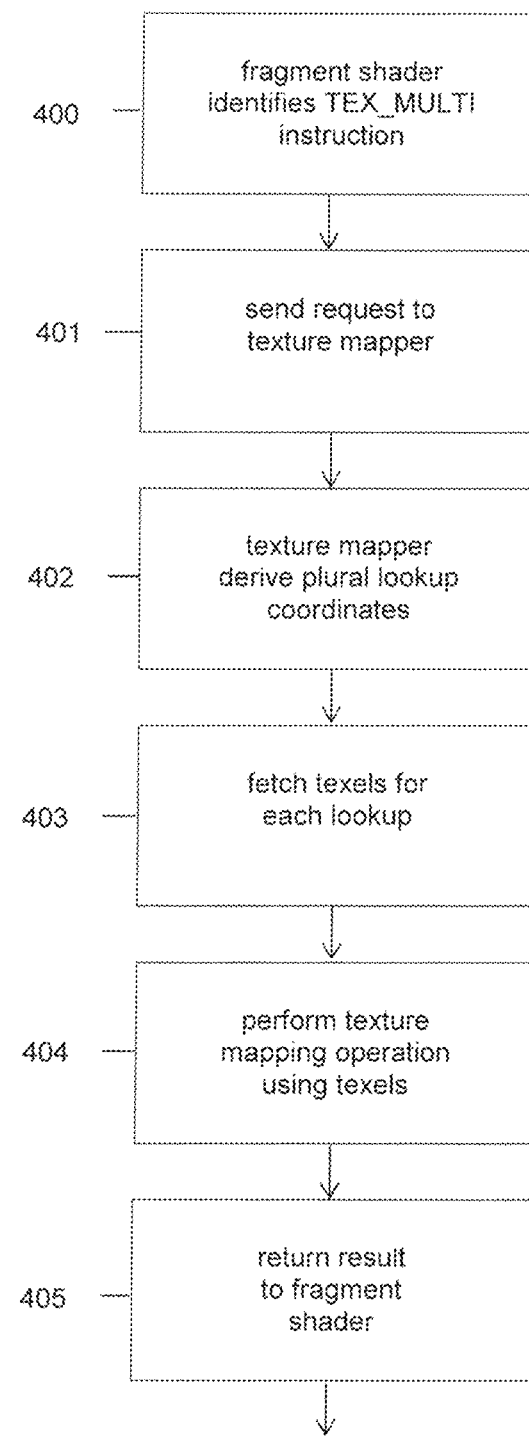
FIG. 4 shows the execution of a texturing instruction in an embodiment of the technology described herein.

FIG. 4 shows schematically the operation of the fragment shader and the texture mapper in an embodiment of the technology described herein.

As shown in FIG. 4, the fragment shader when executing a fragment shader program for a thread will identify the presence of a texturing instruction (TEX_MULTI) in the form of the technology described herein, indicating that two lookups for the same texture should be performed in parallel (step 400), and accordingly send an appropriate texture mapping request to the texture mapper (step 401).

The texture mapper will then derive the coordinates for each of the plural lookups to be performed in parallel from the sample coordinate included with the request (step 402), and fetch the required texels for each lookup (step 403). The texture mapper will then perform the required texturing operation using the fetched texels (step 404) (as discussed above, this operation could, e.g., comprise using the fetched texel values directly to provide the result of the texture mapping operation, or, for example, first performing filtering operations, such as bilinear filtering operations, in parallel using the fetched texels, and then performing a reduction operation to reduce the results of the filtering operations to a reduced, e.g. single four-component, result to be output), and then return the result to the fragment shader (step 405).

This will be done for each thread that executes the TEX_MULTI instruction in the fragment shader program in question.

In the present embodiments, the texture instructions in the manner of the technology described herein are included in shader programs to be executed by the fragment shader of the graphics processor by the compiler for the fragment shader (as part of the compiling of the shader programs). The compiler may, e.g., run as part of the driver 61 on the host CPU 57 for the graphics processor 100. (Other arrangements would, of course, be possible.)

In the present embodiments, the compiler is operable to identify (plural) program expressions in a shader program provided to the compiler for compiling that are performing lookups from the same texture, and then combine those plural expressions (e.g. two lookups from the same 2D texture, or four lookups from the same 1D texture) into a single texturing instruction in the manner of the present embodiments (i.e. to replace those program expressions with an instruction to cause the texturing operations to be performed using a (single) texturing instruction).

The compiler also takes account of the texture mapping operation that is being performed in relation to the lookups from the same texture (and to only combine the lookups into a single texturing instruction when all the lookups are performing the same (or sufficiently similar) texture mapping operation (e.g., and in an embodiment, are (at least) using the same filtering mode).

The compiler also analyses the shader program to determine how the looked up texture values are to be used in the shader program, and then selects the texture mapping operation that the instruction in the manner of the present embodiment is to perform accordingly. The compiler may also omit from the compiled shader program for execution by the fragment shader, any arithmetic operations that will be (instead) performed by the texture mapper as part of the texturing instruction operation.

Figure 5:
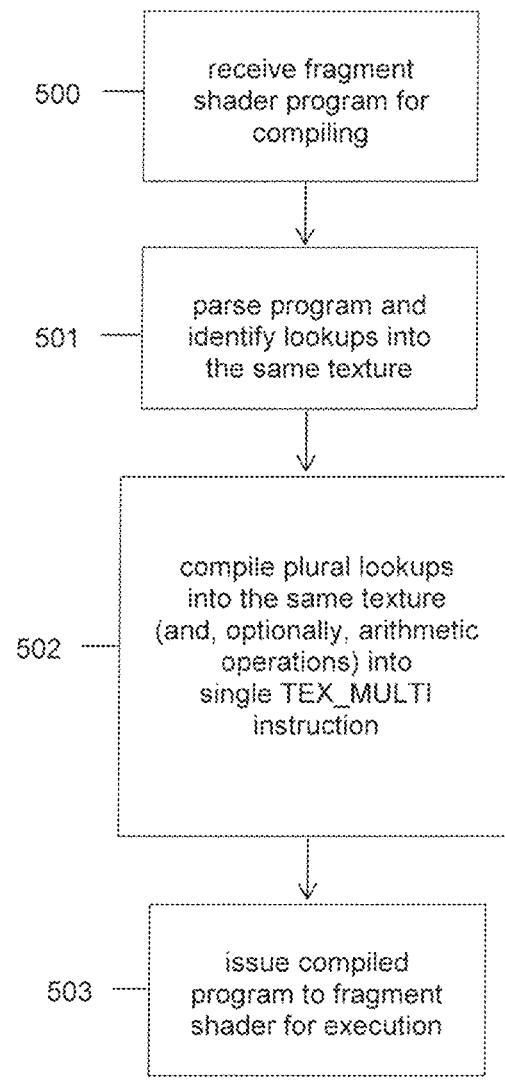
FIG. 5 shows the compiling of a fragment shader program in an embodiment of the technology described herein.

FIG. 5 shows schematically the operation of the compiler in an embodiment of the technology described herein.

As shown in FIG. 5, the fragment shader compiler will receive a fragment shader program for compiling (step 500).

The compiler will then parse the program and identify the presence (if any) of texture lookups into the same texture (step 501).

Where the compiler identifies the presence in the fragment shader program of plural lookups into the same texture, it will then combine plural lookups into the same texture (and, optionally, arithmetic operations that use the results of the plural lookups) into a single TEX_MULTI instruction in the form of the present embodiment (step 502). This may be done multiple times, e.g., in the case where a fragment shader program includes plural instances of plural lookups into the same texture.

The compiled program is then issued to the fragment shader for execution (step 503).

An example of a shader program in which plural lookups could be replaced by only a single texturing instruction in the manner of the present embodiments would be a shader program such as the following OpenGL ES shader program, that performs two texture samples and returns the average colour:

```
#version 300 es
uniform lowp     sampler2D input_texture;
in    highp vec2   coordinate_0;
in    highp vec2   coordinate_1;
out   mediump vec4  result_color;
void main( )
{
    mediump vec4 color = texture( input_texture, coordinate_0 );
    color += texture( input_texture, coordinate_1 );
    color /=2.0;
    result_color = color;
}
```

In accordance with the above embodiments, this shader program could be compiled to the following (pseudo) instruction sequence, which uses instead of the two texture lookups in the above shader program, a single VAR_TEX_MULTI_add instruction that performs those two texture lookups in parallel and adds their results together:

```
mediump vec4 color = VAR_TEX_MULTI_add( input_texture, vec4(
coordinate_0, coordinate_1 ) );
color /=2.0;
```

Corresponding substitutions of TEX_MULTI instructions in the manner of the present embodiments can be used for other fragment shader texturing lookup texture mapping operations, as desired.

It can be seen from the above that the technology described herein, in its embodiments at least, can provide for more efficient texture mapping operations in graphics processing. This is achieved in the embodiments of the technology described herein at least, by using texture mapping instructions that trigger the texture mapper to perform plural lookups from the same texture in parallel (and to generate an appropriate texture mapping operation result using the result of those plural lookups).

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processor, the graphics processor comprising:
a programmable fragment shader operable to execute graphics fragment shader programs to perform fragment shading operations; and a texture mapper operable to perform graphics texture mapping operations in response to requests for graphics texture mapping operations from the fragment shader;
wherein:
the fragment shader processes graphics fragments by executing fragment shader programs using execution threads for sampling positions of a render output being generated by the graphics processor; and
the fragment shader is operable to, when it encounters a graphics texturing instruction in a fragment shader program that it is executing for a thread:
request the texture mapper to perform a graphics texture mapping operation for the thread that is executing the graphics texturing instruction in the fragment shader program; and
the texture mapper is operable to, in response to the request from the fragment shader to perform the graphics texture mapping operation for the execution thread that is executing the graphics texturing instruction in the fragment shader program:
perform the graphics texture mapping operation for the execution thread; the method comprising:
including in a fragment shader program to be executed by the fragment shader of the graphics processor when generating the render output, a particular graphics texturing instruction that when executed by the fragment shader will cause the fragment shader to send a particular request to the texture mapper to perform a particular graphics texture mapping operation for the particular thread that is executing the graphics texturing instruction in which the texture mapper will perform plural lookups from same texture in parallel; and
the fragment shader, when it executes the particular graphics texturing instruction for the particular thread that is executing the graphics texturing instruction, sending the particular request to the texture mapper to perform the particular graphics texture mapping operation in which the texture mapper will perform plural lookups from the same texture in parallel for the particular thread; and
the texture mapper, in response to the particular request from the fragment shader, performing the particular graphics texture mapping operation for the particular thread, including:
performing plural lookups from the same texture in parallel;
generating a texture mapping operation result for the particular thread using the results of the plural lookups from the same texture; and
returning the generated texture mapping operation result to the fragment shader;
the fragment shader using the texture mapping operation result for the particular thread.

2. The method of claim 1, wherein the particular graphics texturing instruction causes the texture mapper to perform two lookups in parallel from a two-dimensional texture or four lookups in parallel from a one-dimensional texture.

3. The method of claim 1, wherein the particular graphics texturing instruction indicates a single multicomponent coordinate from which the coordinates for the plural lookups from the texture are derived by the texture mapper.

4. The method of claim 1, wherein the particular graphics texturing instruction indicates the texture mapping operation that is to be performed using the results of the plural texture lookups.

5. The method of claim 1, wherein the particular texture mapping operation that is performed using the plural lookups from the same texture reduces the amount of data generated by the plural lookups to a reduced amount of data for returning to the fragment shader for further use.

6. The method of claim 1, wherein the particular texture mapping operation that the texture mapper performs using the results of the plural lookups comprises one of:
returning a sum of the texture lookup results;
returning a difference between the texture lookups results;
returning a minimum of the texture lookup results;
returning a maximum of the texture lookup results; and
packing selected components from the plural texture lookup results together to provide the result of the texture mapping operation.

7. The method of claim 1, wherein the texture mapper processes the texels fetched for each texture lookup separately, to thereby generate for each lookup a respective intermediate result, and then processes those lookup intermediate results to provide the texture mapping operation result that is returned to the fragment shader.

8. The method of claim 1, wherein the texture mapper processes the fetched texels for the texture lookups directly to provide the output texture mapping operation result that is returned to the fragment shader.

9. The method of claim 1, wherein the step of including in a fragment shader program to be executed by the fragment shader of the graphics processor when generating the render output, the particular graphics texturing instruction that when executed by the fragment shader will cause the fragment shader to send the particular request to the texture mapper to perform the particular graphics texture mapping operation for the particular thread that is executing the graphics texturing instruction in which the texture mapper will perform plural lookups from the same texture in parallel comprises:
analysing a fragment shader program to identify whether the fragment shader program includes plural different program expressions that each perform a texture mapping operation that performs a lookup into the same texture; and
in response to identifying plural different program expressions each performing a texture mapping operation that performs a lookup into the same texture in the shader program:
replacing two or more of the identified plural different program expressions with the single particular graphics texturing instruction that when executed by the fragment shader will cause the fragment shader to send the particular request to the texture mapper to perform the particular graphics texture mapping operation for the particular thread that is executing the graphics texturing instruction in which the texture mapper will perform plural lookups from the same texture in parallel.

10. A graphics processing system, the graphics processing system comprising:
a graphics processor comprising:
a programmable fragment shader circuit operable to execute graphics fragment shader programs to perform fragment shading operations; and
a texture mapper circuit operable to perform graphics texture mapping operations in response to requests for graphics texture mapping operations from the fragment shader circuit;
wherein:
the fragment shader circuit processes graphics fragments by executing fragment shader programs using execution threads for sampling positions of a render output being generated by the graphics processor; and the fragment shader circuit is operable to, when it encounters a graphics texturing instruction in a fragment shader program that it is executing for a thread:

request the texture mapper circuit to perform a graphics texture mapping operation for the thread that is executing the graphics texturing instruction in the fragment shader program; and the texture mapper circuit is operable to, in response to the request from the fragment shader circuit to perform the graphics texture mapping operation for an execution thread that is executing a graphics texturing instruction in the fragment shader program:

perform the graphics texture mapping operation for the execution thread;

wherein:

the graphics processing system further comprises processing circuitry operable to:

include in a fragment shader program to be executed by the fragment shader circuit of the graphics processor when generating the render output, a particular graphics texturing instruction that when executed by the fragment shader circuit will cause the fragment shader circuit to send a particular request to the texture mapper circuit to perform a particular graphics texture mapping operation for the particular thread that is executing the graphics texturing instruction in which the texture mapper circuit will perform plural lookups from same texture in parallel; and the fragment shader circuit is configured to, when it executes the particular graphics texturing instruction for the particular thread that is executing the graphics texturing instruction:

send the particular request to the texture mapper circuit to perform the particular graphics texture mapping operation in which the texture mapper circuit will perform plural lookups from the same texture in parallel; and the texture mapper circuit is configured to, in response to the particular request from the fragment shader circuit:

perform a graphics texture mapping operation including:

performing plural lookups from the same texture in parallel;

generating a texture mapping operation result for the particular thread using the results of the plural lookups from the same texture; and returning the generated texture mapping operation result to the fragment shader circuit; and the fragment shader circuit is further configured to, when it receives the generated texture mapping operation result from the texture mapper circuit:

use the texture mapping result for the particular thread.

11. The system of claim 10, wherein the particular graphics texturing instruction causes the texture mapper circuit to perform two lookups in parallel from a two-dimensional texture or four lookups in parallel from a one-dimensional texture.

12. The system of claim 10, wherein the particular graphics texturing instruction indicates a single multicomponent coordinate from which the coordinates for the plural lookups from the texture are derived by the texture mapper circuit.

13. The system of claim 10, wherein the particular graphics texturing instruction indicates the texture mapping operation that is to be performed using the results of the plural texture lookups.

14. The system of claim 10, wherein the particular texture mapping operation that is performed using the plural lookups from the same texture reduces the amount of data generated by the plural lookups to a reduced amount of data for returning to the fragment shader circuit for further use.

15. The system of claim 10, wherein the particular texture mapping operation that the texture mapper circuit performs using the results of the plural lookups comprises one of:

returning a sum of the texture lookup results;

returning a difference between the texture lookups results;

returning a minimum of the texture lookup results;

returning a maximum of the texture lookup results; and packing selected components from the plural texture lookup results together to provide the result of the texture mapping operation.

16. The system of claim 10, wherein the texture mapper circuit processes the texels fetched for each texture lookup separately, to thereby generate for each lookup a respective intermediate result, and then processes those lookup intermediate results to provide the texture mapping operation result that is returned to the fragment shader circuit.

17. The system of claim 10, wherein the texture mapper circuit processes the fetched texels for the texture lookups directly to provide the output texture mapping operation result that is returned to the fragment shader circuit.

18. A texture mapping apparatus operable to perform graphics texture mapping operations in response to requests for graphics texture mapping operations from a fragment shader;

the texture mapping apparatus comprising:

a texture lookup circuit configured to, in response to a request from a fragment shader to perform a texture mapping operation for an execution thread that is executing a graphics texturing instruction in a shader program, perform plural lookups from same texture in parallel;

a texture mapping operation result generating circuit configured to generate a texture mapping operation result for that thread using the results of plural lookups made from the same texture by the texture lookup circuit; and a texture mapping operation result output circuit configured to return a texture mapping operation result generated by the texture mapping operation result generating circuit to the fragment shader so it can be used for that thread.

19. A non-transitory computer readable storage medium storing computer software code which when executing on a processor performs a method of compiling a fragment shader program for execution by a fragment shader of a graphics processor, the method comprising:

receiving a fragment shader program to be compiled;

analysing the received fragment shader program to identify whether the fragment shader program includes plural different program expressions that each perform a texture mapping operation that performs a lookup into same texture; and in response to identifying plural different program expressions each performing a texture mapping operation that performs a lookup into the same texture in the shader program:

replacing two or more of the identified plural different program expressions with a single texturing instruction that when executed by the fragment shader for a particular thread will cause the fragment shader to send a request to the texture mapper to perform a graphics texture mapping operation for the particular thread in which the texture mapper will perform plural lookups from the same texture in parallel.

20. The computer readable storage medium of claim 19, wherein the method further comprises:

analysing the shader program to determine how the looked up texture values are used in the shader program; and setting the texture mapping operation that the single texturing instruction causes the texture mapper to perform on the basis of how the looked up texture values are used in the shader program.

21. The computer readable storage medium of claim 19, wherein the method further comprises:

identifying any arithmetic operations performed using the results of the texture lookups in the shader program; and configuring the single texturing instruction that is included in the compiled shader program to perform some or all of those arithmetic operations as well; and omitting from the compiled shader program for execution by the fragment shader for the particular thread, an arithmetic operation that will be performed by the texture mapper as part of the texturing instruction operation.

* * * * *